July 25, 1967

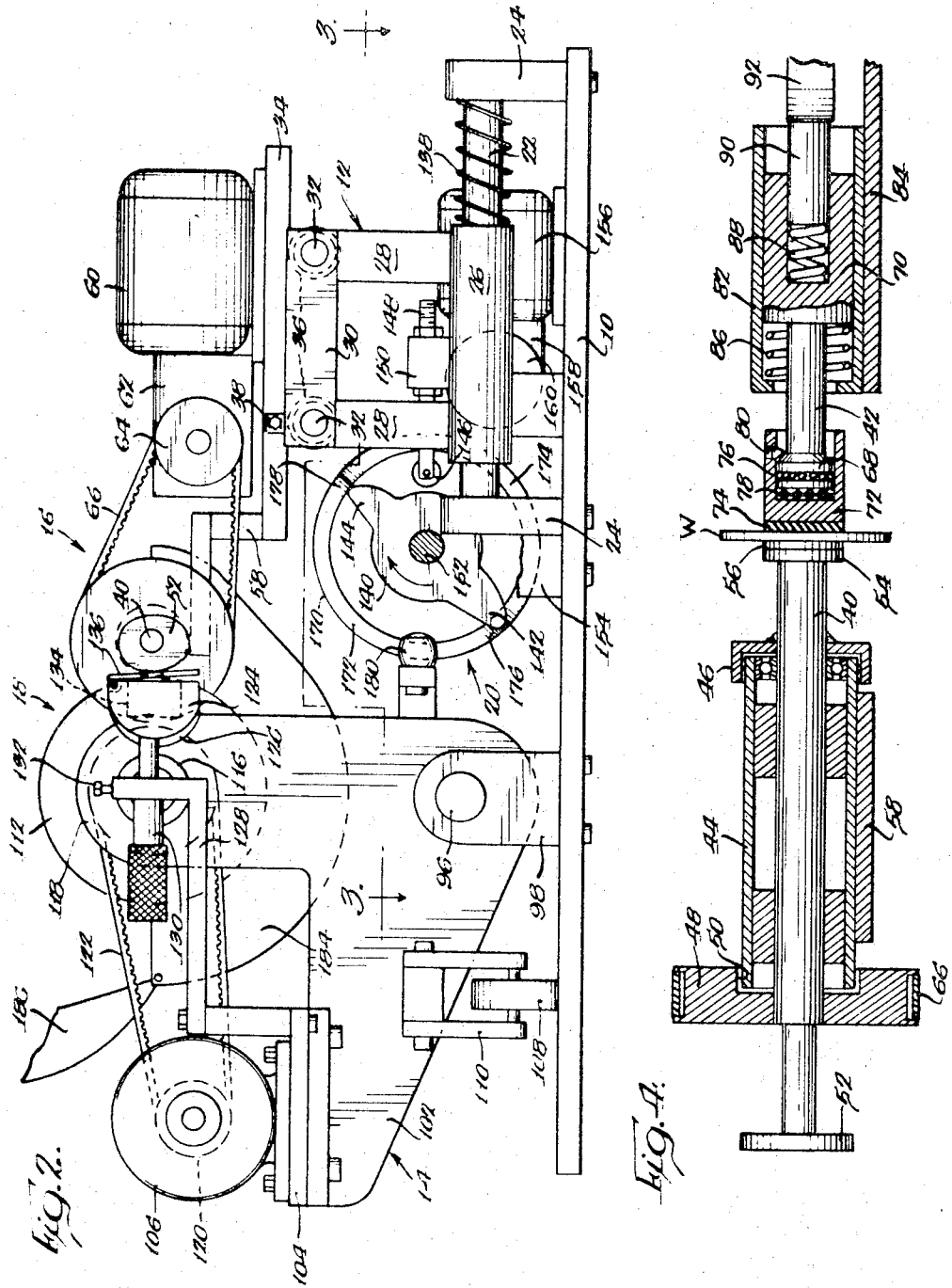

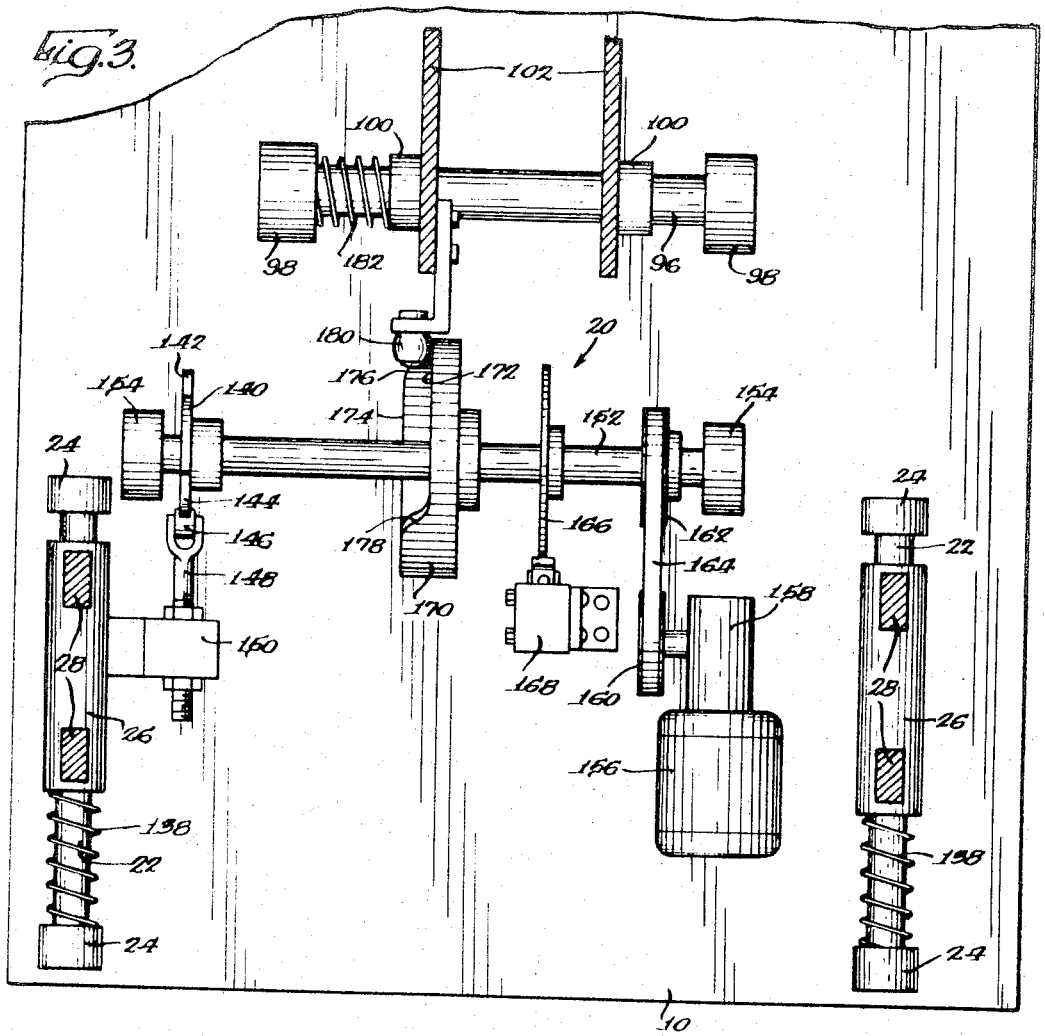

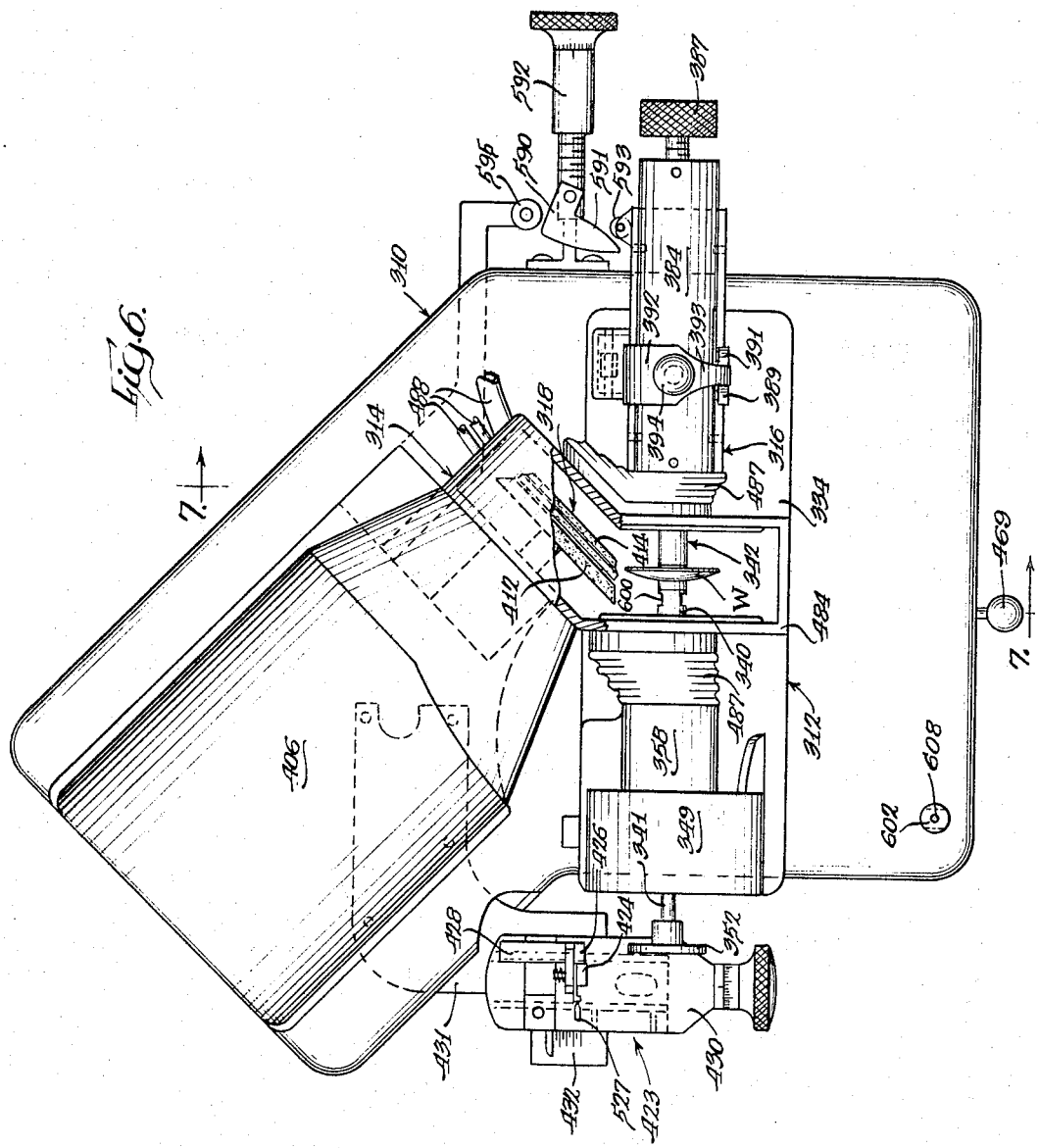

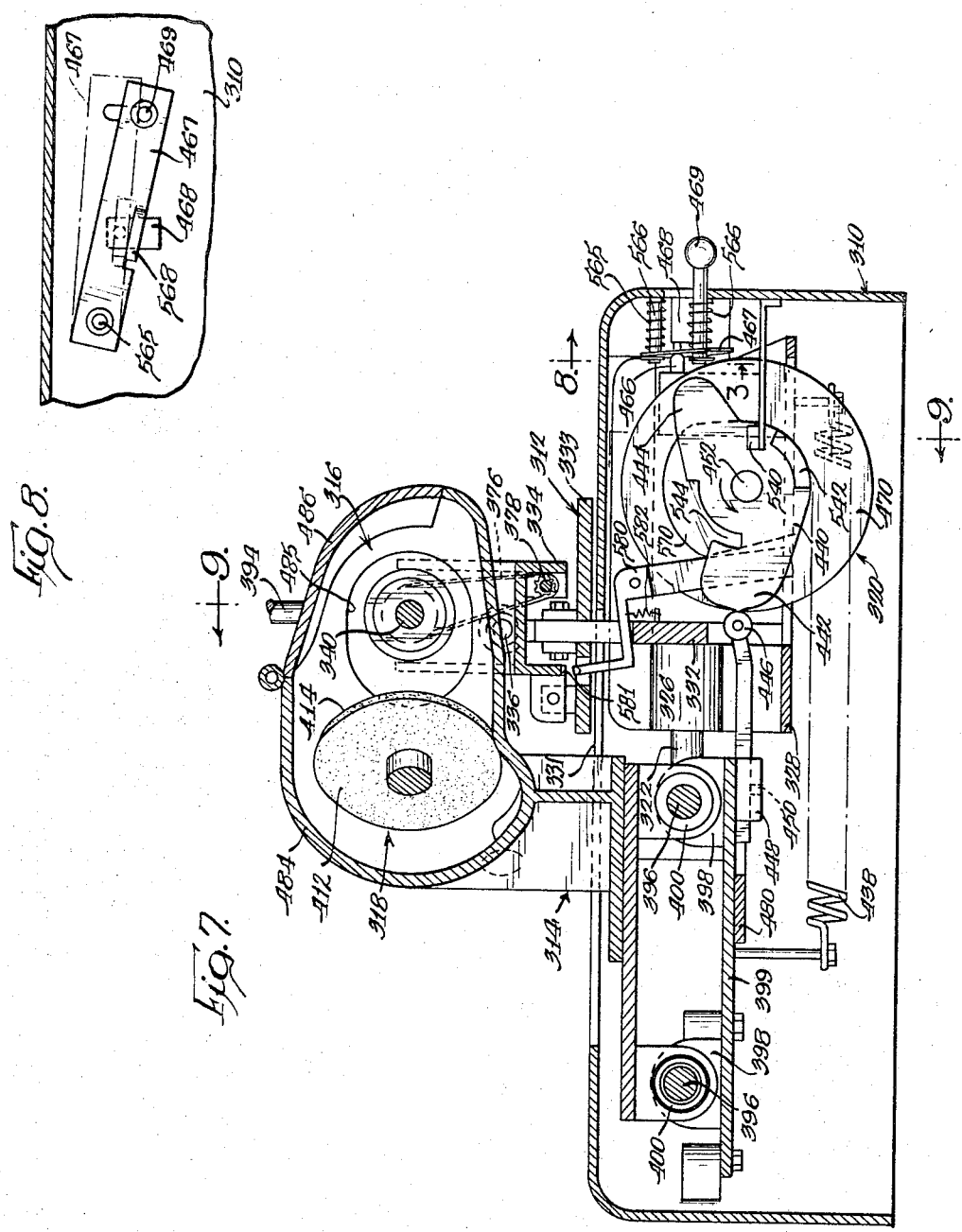

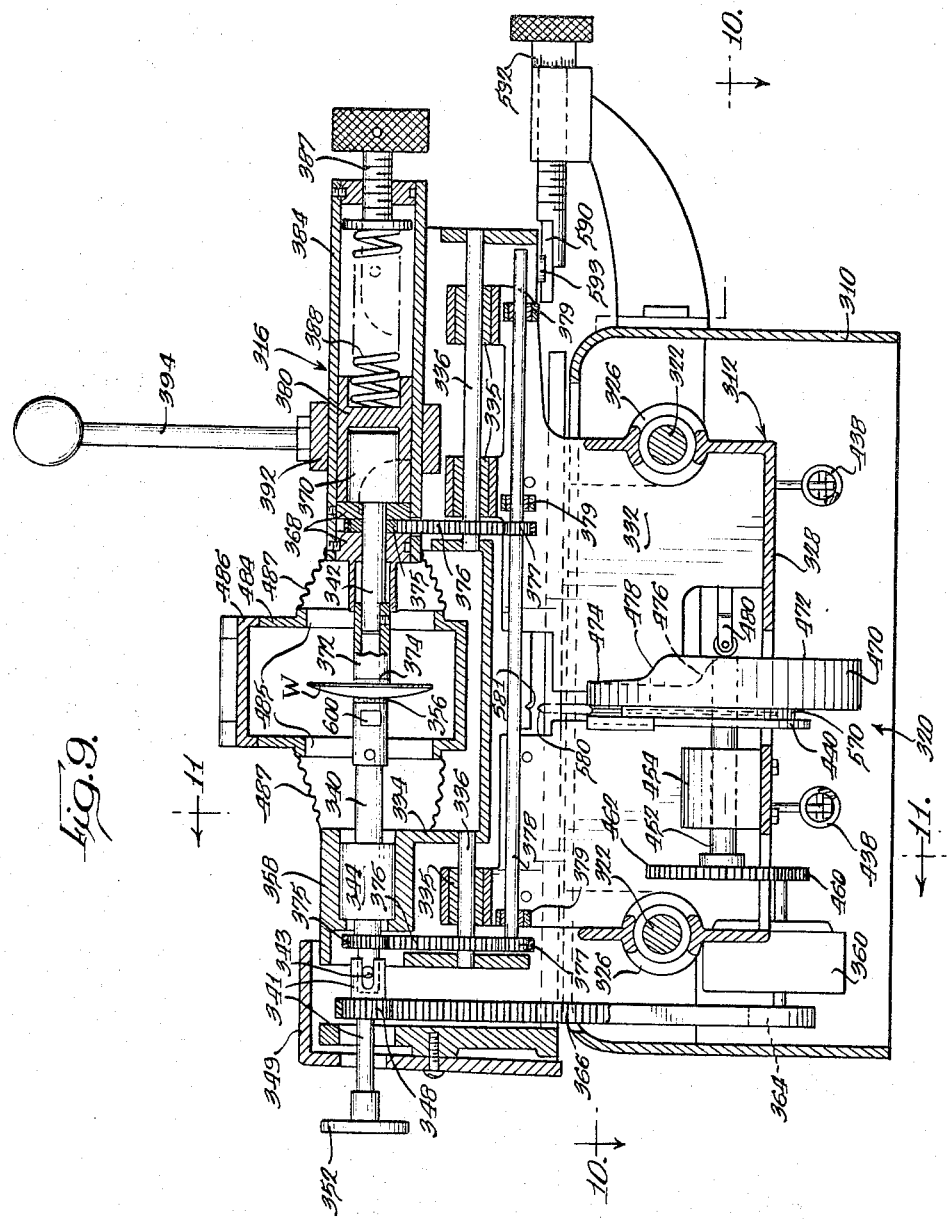

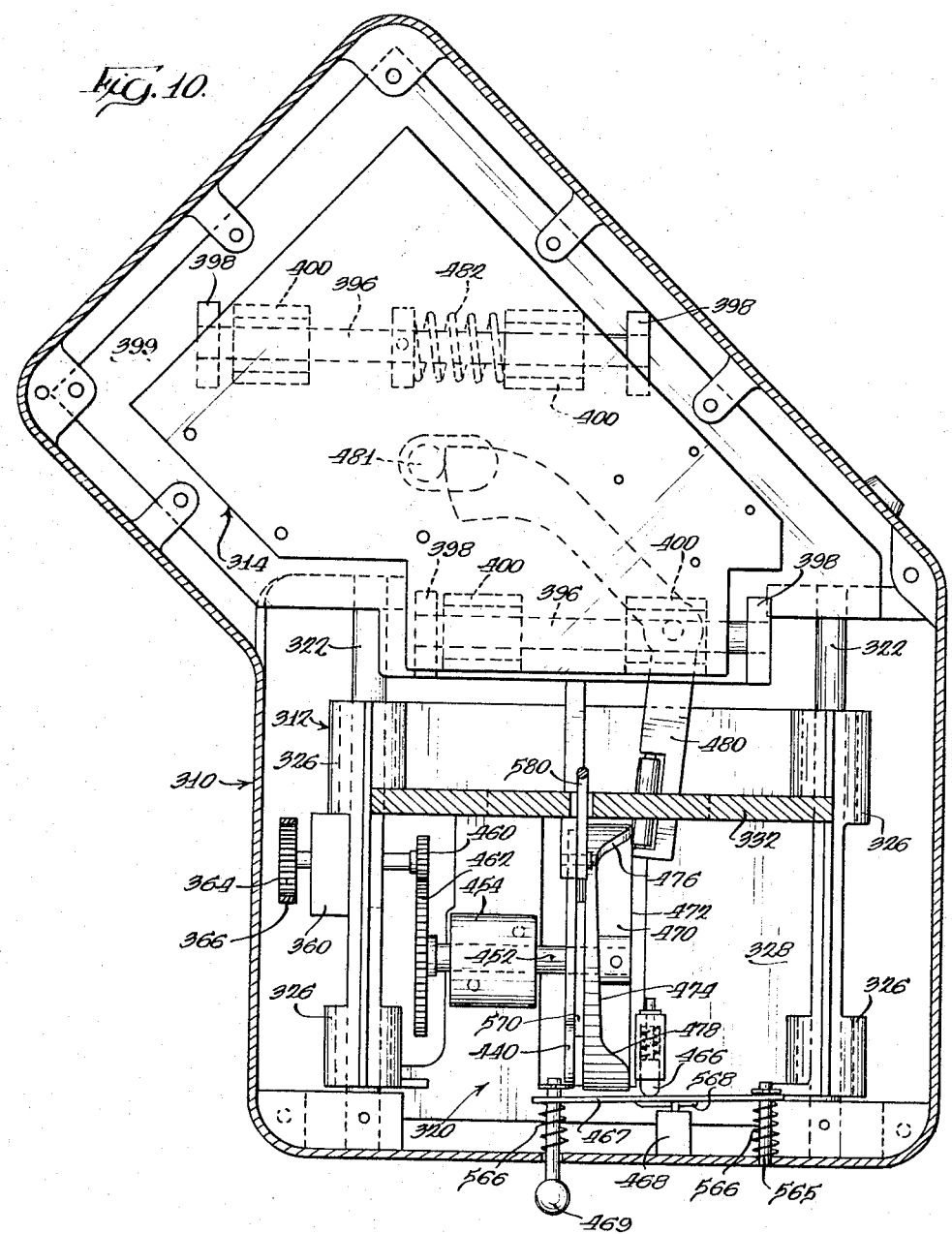

A. STERN 3,332,172

AUTOMATIC EDGER

Filed Nov. 16, 1964

Inventor:
Albert Stern
By
Gary, Parker, Juettner & Cullinan
Atty

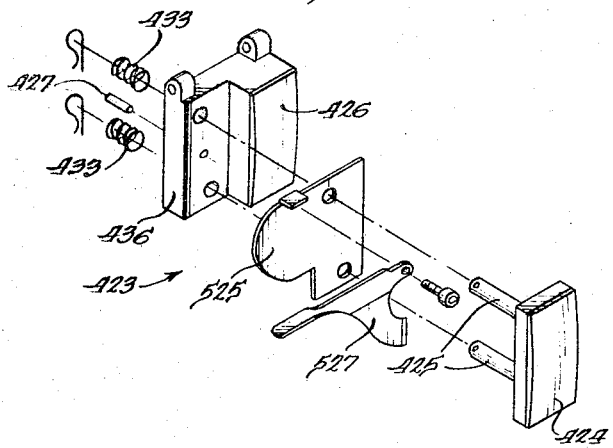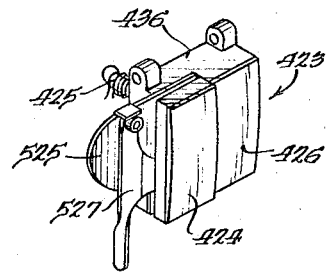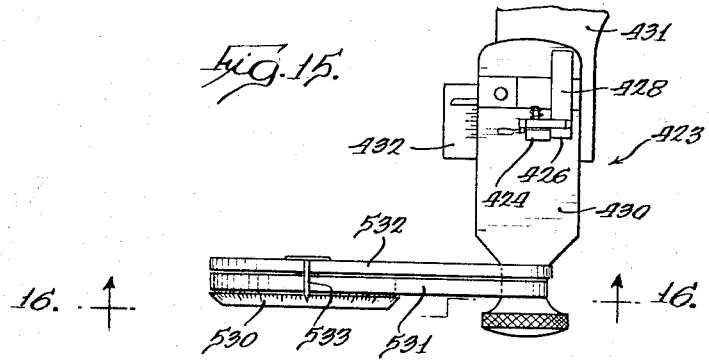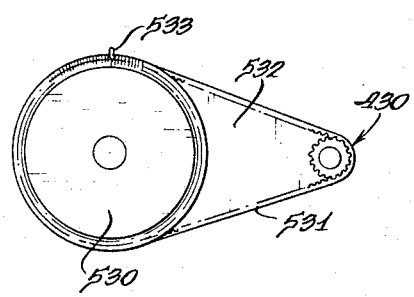

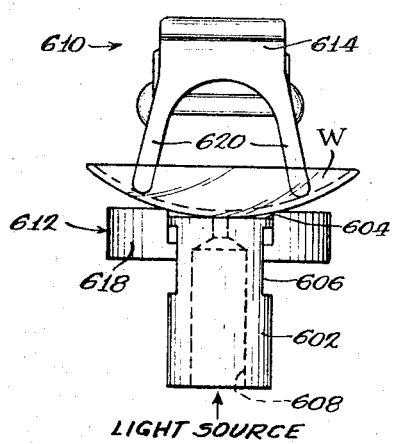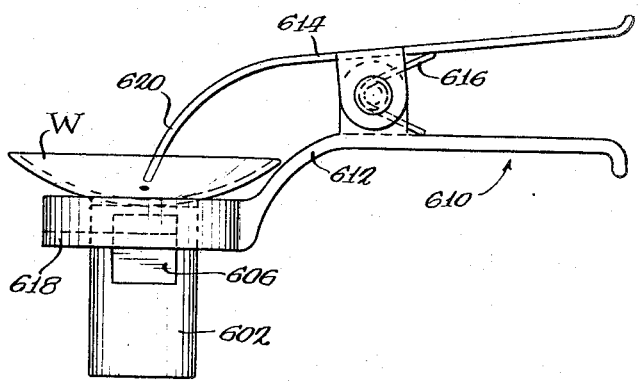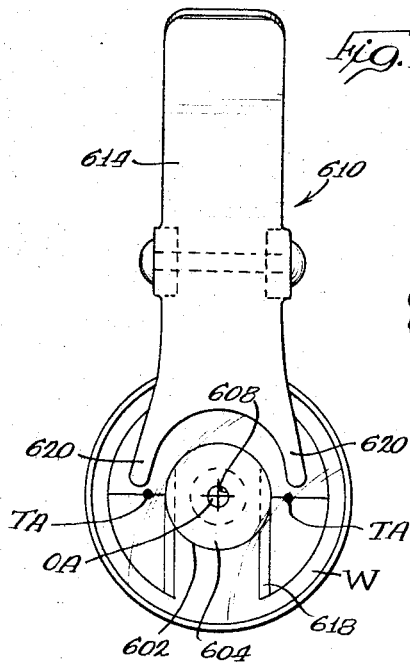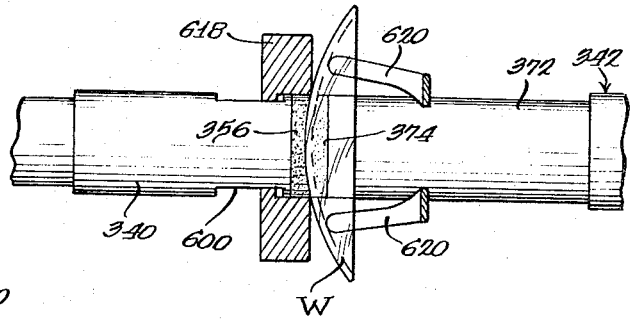

United States Patent Office 3,332,172
Patented July 25, 1967

3,332,172
AUTOMATIC EDGER
Albert Stern, Lincolnwood, Ill., assignor to A.I.T. Machine Co., Inc., Skokie, Ill., a corporation of Illinois
Filed Nov. 16, 1964, Ser. No. 411,332
23 Claims. (Cl. 51—101)

ABSTRACT OF THE DISCLOSURE

A machine for grinding the peripheral edge of eyeglass lenses to shape and size comprising a rough grinding wheel and a bevel edge grinding wheel mounted side by side on a first axial shiftable frame for successive engagement by a lens, a work carriage having a rotary lens holder mounted on a second frame for movement toward and away from the wheels, cam means for governing movement of the second frame and shifting movement of the first frame to bring the edge of the lens into engagement first with the rough wheel and thereafter with the bevel wheel, a master template for governing the engagement of the lens with each wheel and thus the shaping of the lens, and switches under the control of the master template for causing rotation of the lens and the cams primarily as a function of the finishing to size of successive portions of the edge of the lens by each wheel. Provision is made for essentially free floating movement of the lens carriage during bevel grinding to permit the lens to follow its own concavo-convex configuration so that the bevel is uniformly located on the lens edge. Supplemental features are also embodied in the machine.

---

This application is a continuation in part of my earlier application, Ser. No. 262,175, filed Mar. 1, 1963, now abandoned.

The present invention relates to apparatus for forming and sizing articles of manufacture to a predetermined outline or edge configuration, and particularly, to improved means for automatically shaping and finishing, for example grinding, relatively thin articles, such as eyeglass lenses, to a predetermined edge configuration.

While the present invention is not limited to either grinding or to eyeglass lenses, but is generally applicable to edge finishing within the skills of the art, the invention will be described hereinafter with reference to the grinding of the edges of eyeglass lenses to a predetermined configuration or outline thereby to illustrate the usefulness of the invention. It will be appreciated, however, that such description is merely exemplary of the fields of applicability of the invention.

Eyeglass lenses of better quality and/or for prescription glasses having an intricate outline are usually edge-ground to the desired outline from a concavo-convex circular disc of glass. Grinding is best carried out in two stages, namely, a rough grind to desired outline, and a finish grind to size. In finish grinding, it is customary to form a beveled edge on the lens. The stated disiderata have been difficult to achieve in practice for a variety of reasons; notable among which are the difficulty of transferring the lens from a rough grinding operation to a finish grinding operation without losing correlation between the lens and a pattern therefor and/or without reliance upon considerable manual labor by skilled artisans, and the difficulty of maintaining the edge of the lens in proper register with the grinding wheel, especially a V-grooved beveling wheel, due to the undulatory configuration of the edge resulting, for example, from the grinding of an elliptical shape from a concavo-convex circular disc.

The object of the present invention is to provide an automatic forming and sizing machine for automatically performing multiple finishing operations on articles from a single set-up of the article in the machine, substantially irrespective of the starting, intermediate and end configurations of the article's edge and without reliance on skilled labor; in other words, an economical automatic shaping and finishing machine for mass production purposes.

More specifically, it is an object of the invention to provide an automatic forming and sizing machine comprising a first frame reciprocable along a first axis, a second frame located along said first axis in juxtaposition to said first frame and reciprocable along a second axis transverse to the first axis, work holder means on one of said frames for holding a work piece generally parallel to said first axis, a plurality of finishing means mounted side-by-side on the other of said frames with the finishing surfaces thereof transverse to said first axis, means for driving at least one of said work holder and finishing means, and means for reciprocating said frames along their respective axes in timed relation to one another to bring a work piece into engagement selectively with said finishing means, whereby the edge of the article, from a single set-up in the work holder, may be worked upon successively by a plurality of finishing means in a continuous sequence of operations entirely automatically.

Another object of the invention is to provide a machine as aforesaid including replaceable template means mountable on the work holder, and a template follower associated with the finishing means for automatically guiding relative movement of the work and the finishing means, thereby automatically to impart a predetermined edge configuration to the work from a single set-up by automatic performance of said continuous sequence of finishing operations.

It is another object of the invention to provide a machine as above defined including a carriage for said work holder, said carriage being floatingly mounted on the holder mounting frame for self-adjusting movement transversely of said first axis thereby to accommodate self-aligning movement of the work relative to the finishing means, especially during beveling, to maintain proper relationship between the two despite formation, for example, of an edge configuration that undulates transversely of said first axis.

An additional object of the invention is the provision of a forming machine of the character described including means facilitating economical finishing of the articles, characterized in that means for bringing successive portions of the article into operative relation to the finishing means is primarily under the control of switch means actuated by the above described template, whereby finishing of the article is effected at high speed a portion at a time in accordance with the capability of the finishing instrumentalities to finish the particular article.

A further object of the invention is the provision of an automatic edging machine including a work holder constructed for high speed operation for rapid mounting and demounting of work pieces, and means associable therewith for quickly mounting lenses and the like in the holder in proper alignment with the holder and the template.

A still further object is to embody the invention in a compact, economical structure satisfying the demands of industry and affording a practical mass production tool.

Other objects and advantages of the invention will become apparent in the following detailed description.

Now, in order to acquaint those skilled in the art with the manner of making and using my improved forming and sizing machine, I shall describe, in connection with the accompanying drawings, preferred embodiments of the machine and the preferred manners of making and using the same.

In the drawings, wherein the reference numerals indicate like parts:

FIGURE 2 is a side elevation of the machine as viewed from the left side of FIGURE 1;

FIGURE 3 is a horizontal sectional view taken substantially on line 3—3 of FIGURE 2;

FIGURE 4 is a longitudinal section of the work holder, the view being taken substantially on line 4—4 of FIGURE 1;

FIGURE 5 is a fragmentary vertical section of the work carriage, the view being taken substantially along line 5—5 of FIGURE 1;

FIGURE 6 is a plan view of a second embodiment of the machine of my invention;

FIGURE 7 is a vertical section taken substantially on line 7—7 of FIGURE 6;

FIGURE 8 is a detail sectional view taken substantially on line 8—8 of FIGURE 7;

FIGURE 9 is a vertical longitudinal section taken substantially along line 9—9 of FIGURE 7;

FIGURE 10 is a horizontal section of the machine taken substantially along line 10—10 of FIGURE 9;

FIGURE 13 is an exploded perspective and FIGURE 14 is an assembled perspective of the pad means associated with the template actuated switch means;

FIGURE 15 is a plan view, on a reduced scale, of adjusting means for the template actuated switch means;

FIGURE 16 is a view taken on line 16—16 of FIGURE 15;

FIGURE 17 is an end elevation of lens aligning and mounting apparatus forming part of my invention;

FIG. 18 is a side elevation and FIGURE 19 is a plan view of said apparatus; and

FIGURE 20 is a plan view illustrating the lens chucking means or work holder of my machine and (in section) a portion of the apparatus of FIGURES 17–19 used in accurately mounting a lens in the chuck.

Figure 1:
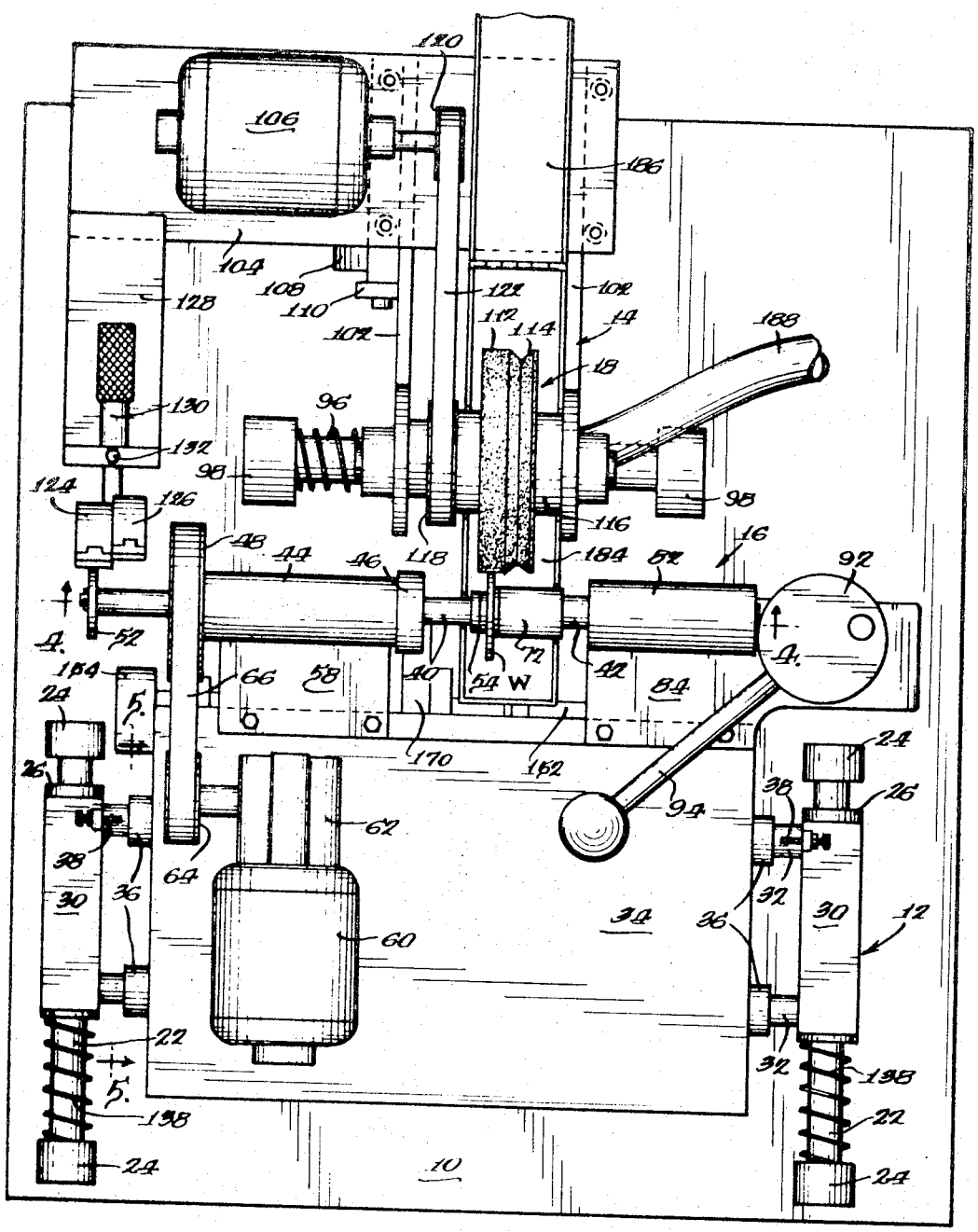
FIGURE 1 is a plan view of a first embodiment of the machine of my invention.
Figure 11:
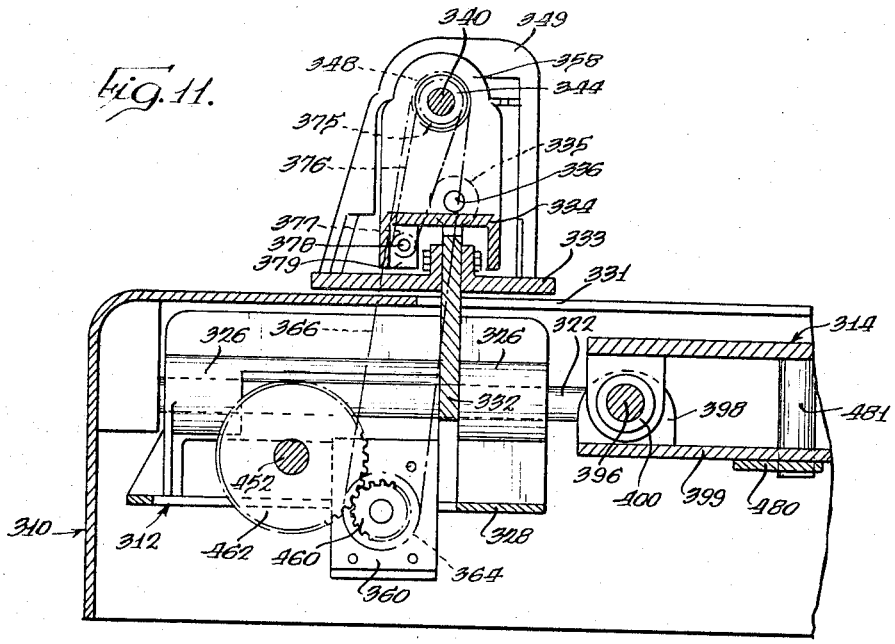
FIGURE 11 is a fragmentary vertical cross section taken substantially on line 11—11 of FIGURE 9.
Figure 12:
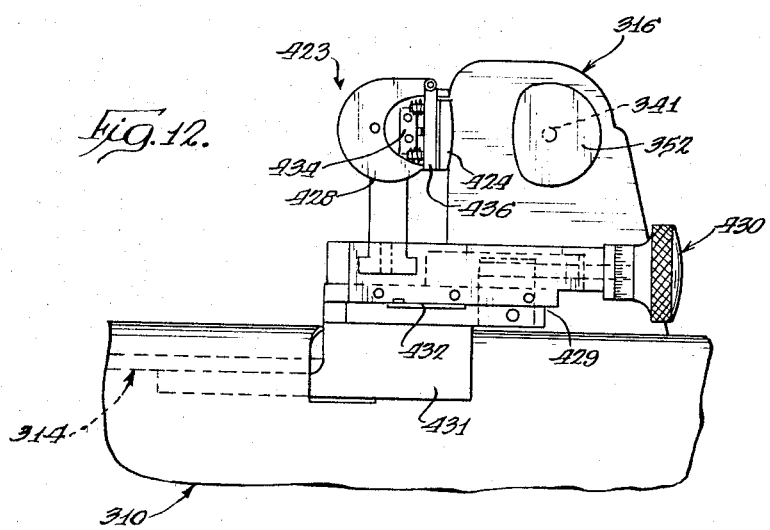
FIGURE 12 is a fragmentary end elevation taken from the left side of FIGURE 6.

Referring to the drawings, the first embodiment of my automatic edge forming and sizing machine is shown in FIGURES 1 to 5 as comprising a base plate 10, first frame 12 mounted on said base plate for reciprocating along a first axis, i.e., the longitudinal axis of the plate, a second frame 14 juxtaposed to said first frame along said first axis and mounted on said base plate for reciprocation along a second axis transverse to the first, preferably at right angles to the first axis, work holder means 16 on the first frame 12, finishing means 18 on the second frame 14, and means indicated generally at 20 for reciprocating the two frames along their respective axes.

The first frame 12 is reciprocably mounted on the base plate 10 by a pair of laterally spaced longitudinally extending guides 22, the guides being disposed adjacent the sides of the base plate 10 and mounted in spaced parallel relation thereto by uprights 24 provided at the ends of each guide. The guides 22 are preferably hardened steel rods and the frame 12 includes tubes or sleeves 26 of a length less than said rods slidably telescoped over said rods. A pair of bars 28 extend upwardly from each tube or sleeve 26 and each pair are joined at their upper ends by a longitudinal strap 30, the two straps 30 in turn being joined transversely of the base by a pair of longitudinally spaced rods or guides 32.

The work holder means 16 comprises a work carriage in the form suitably of a flat horizontal plate 34 slidably mounted on the guide or rods 32 by a pair of tubes or sleeves 36 secured to the lower surface of the plate 34, the sleeves 36 being of a length less than the rods 32 and slidably telescoping over said rods. Preferably, the carriage 34 is generally centered on the frame 12 with freedom for predetermined movement, for example by a plurality of set screws 38 extending toward the sides of the carriage or its bearing sleeves 36 from the adjacent straps 30 of the frame 12.

Mounted adjacent the forward edge of the carriage plate 34 is a work holder comprising a pair of axially aligned juxtaposed shafts 40 and 42, shown particularly in FIGURES 1 and 4. The shaft 40 is an integral elongate rod journalled intermediate its ends in a bearing assembly 44, the assembly comprising a tube mounting a pair of either solid or needle bearings and a ball bearing for securely mounting the shaft against end play, whereby the shaft is mounted for free but true rotation about its axis and is retained against endwise movement. Secured to the shaft adjacent one end of the bearing tube is a slinger 46, the slinger comprising a radial flange portion adjacent the end of the tube and an annular wall encircling the end of the tube to provide an air seal preventing entry of foreign matter to the bearings. Adjacent the opposite end of the tube, a combined sprocket wheel and slinger seal 48 is detachably secured to the shaft, the composite member comprising a radial flange having a counterbore 50 therein defining the slinger seal and having a toothed periphery comprising a drive pulley or sprocket for the shaft.

At its outer end, the shaft 40 is necked-down or otherwise formed to facilitate detachable mounting in predetermined relation thereto of a template 52. The template 52 is, of course, of the outline desired for the article to be worked upon by the machine, and the illustrated template may be replaced by any of a variety of differently shaped templates for different purposes. At its inner end, the shaft 40 includes an integral radial flange 54 to which a resilient work holding pad 56 is secured.

The shaft 40 is suitably mounted adjacent the forward edge of the carriage plate 34 at right angles to the axis of reciprocable movement of the plate 12 by an S-shaped bracket 58 fixedly secured to the tube of the bearing 44 and adjustably or detachably secured to the plate 34, the bracket mounting the shaft in upwardly and forwardly spaced relation to the plate. To drive the shaft, an electric motor 60 having a gear reducer 62 is mounted on the plate 34. The reducer has an output pulley or sheave 64 aligned with the pulley member 48, and a toothed belt 66 is trained over the two pulleys to establish a positive drive for the shaft 40.

The shaft 42 is aligned axially with the shaft 40 and is provided adjacent its opposite ends with enlarged heads 68 and 70. The head 68 at the inner end of the shaft rotatably mounts a cup-shaped center or end cap 72, which cap carries a resilient work holding pad 74 juxtaposed to the pad 56 on the shaft 40. The cap or center 72 is journalled on the head 68 by an annular series of balls 76 fitting within a circumferential groove in the head, and a plurality of balls 78 are positioned between the end face of the head and the center to provide a thrust bearing. To secure the cap on the head for free rotation thereon, a set screw 80 extends through the cap immediately rearwardly of the shoulder defined by the outer surface of the head 68. The hole provided in the cap for the screw may be utilized to facilitate installation of the bearing balls 76 and 78.

The head 70 at the outer end of the shaft 42 is slibably but non-rotatably mounted in a tubular bearing 82, which is mounted on the carriage plate 34 by a bracket 84 substantially identical to the bracket 58. A compression spring 86 of relatively low strength, e.g., 5 pounds, is disposed between the head 70 and the inner end of the tube 82 normally to bias the shaft 42 and its pad 74 away from the shaft 40 and its pad 56. Also, the head 70 is provided with an internal recess within which a much stiffer compression spring 88 is disposed, this spring suitably having a strength in the order of about 40 to about 100 pounds. For eyeglass lens work, I prefer a spring of about 70 pounds strength.

Slidably received within the spring mounting bore or recess is an actuator or plunger 90 which projects outwardly beyond the head 70 and the tube 82 for engagement by an eccentric cam 92 which is rotatably mounted for movement about a vertical axis on a relatively adjustable separable portion or extension of the bracket 84 to accommodate adjustment of the cam relative to the plunger 90 and spring 88. The cam 92 is provided with a forwardly extending handle 94 whereby the cam may be swung about its pivot axis toward and away from the shaft 42. As the eccentric is moved toward the shaft, the same moves the plunger 90 toward the left thereby causing compression of the relatively weak spring 86 and movement of the shaft 42 to the left (as viewed in FIGURES 1 and 4) to bring its pad 74 into engagement with the work piece W, such as an eyeglass lens, to clamp the work piece between the two pads 56 and 74 at the adjacent ends of the two shafts. Further rotary movement of the eccentric cam into locked position causes compression of the stronger spring 88 whereby to impose a predetermined clamping force (e.g. 70 pounds) on the work piece, whereby the work piece is firmly held in position but can never be subjected to a force beyond the compressive force of the spring 88.

A simple swing of the handle 94 in one direction thus effects clamping of the work piece between the two shafts, and swing of the handle in the opposite direction effects quick release of the work piece from the work holder.

To perform successive edge finishing operations on the thus mounted work piece, the finishing means 18 is mounted on the second frame 14 in juxtaposition to the work piece, i.e., the inner end of the work holder shaft 40. The second frame 14 is slidably mounted on the base plate 10 for movement at right angles to the frame 12, i.e., parallel to the work holder shaft 40–42, by means of a transverse guide 96 mounted in spaced parallel position above the plate 34 by a pair of uprights 98 provided at the ends of the guide. The second frame comprises a tube or sleeve, or a pair of tubes or bearings 100 slidably mounted on the guide 96, a pair of spaced parallel longitudinally extending L-shaped side frames 102 projecting upwardly from the bearing means 100 and a cross plate 104 extending between the side frames at the ends thereof spaced from the work holder 16. The guide 96 and bearing means 100, like the guide and bearing assemblies 22–26 and 32–36, preferably comprises a hardened steel shaft or rod and slide, water pump or die guide bearings having hardened steel balls riding on the rod, the bearings being mounted in tubes or sleeves and being sealed by felt rings or the like to constitute inexpensive precision bearing means mitigating wear, even in the presence of highly abrasive ground glass.

The cross plate 104, in the illustrated embodiment of the invention, mounts an electric drive motor 106 for the finishing means 18. The motor mounting end of the frame 14 is suitably supported on the base plate 10 for relative movement by a wheel or bearing 108 mounted parallel to the guide 96 on a bracket 110 depending from one of the side frame members 102, the wheel being located centrally beneath the motor and frame assembly.

The finishing means 18 provided for edging eyeglass lenses comprises a pair of rotary grinding wheels 112 and 114, preferably diamond wheels, mounted side-by-side on an arbor 116 which is journalled on and extends between the side frames 102 in spaced parallel relation to the work holder shaft 40–42, the two wheels being mounted with their peripheries, i.e. their finishing surfaces, disposed transversely of or in opposition to the edge of the work piece W. To drive the grinding wheels, aligned sprockets or toothed pulleys 118 and 120 are mounted on the arbor 116 and the shaft of motor 106, respectively, and a toothed belt 122 is trained over the pulleys.

As will presently be described, the frame 12 is moved toward the frame 14 initially to engage the work piece with the grinding wheel 112, it is then backed away from the frame 14 to accommodate transverse movement of the latter frame, and is then moved toward the frame 14 to engage the work piece with the grinding wheel 114. The operations performed are an initial rough grind, for purposes of which the wheel 112 is a rough texture wheel having a smooth periphery, and a second finish grind, for which purpose the wheel 114 is a fine texture wheel having a V-groove periphery for forming a bevel on the edge of the lens W. To guide the lens W for formation of a predetermined outline or edge configuration, a template 52 of the desired outline is affixed to the end of the work holder shaft 40 for cooperation with a pair of template followers 124 and 126 which are correleated respectively to the wheels 112 and 114.

The two followers are spaced laterally from their respective wheels by a distance equal to the spacing between the template 52 and the lens W, whereby the follower 124 is aligned with the template when the lens is aligned with the rough grinding wheel 112 and the follower 126 is aligned with the template when the lens is aligned with the finishing wheel 114. The two followers are mounted on a bracket 128 projecting forwardly from the cross plate 104 of the frame 14, and to compensate for differences in grinding wheel shape, size, wear and replacement, are adjustable on said bracket and relative to one another. In the embodiment herein shown, the follower 125 is mounted on the case of a micrometer 130 which is adjustably mounted on the bracket 128 by a set screw 132, and the follower 126 is mounted on the stem of the micrometer for independent fine adjustment to secure a precisely finished lens.

Each of the followers 124 and 126 (as shown for the follower 124 in FIGURE 2) comprises a case fixed to the respective part of the micrometer, a switch 134 in said case and a depending hinged wear plate, pad or cover 136 on the front face of the case adapted to be engaged by the template. The two switches 134 are connected in parallel with one another and in series with the drive motor 60 of the work holder, whereby said motor is energized and the lens is rotated only when the template engages a respective pad 136 and closes a respective one of the switches 134. Consequently, when the frame 12 is moved to engage the lens W with either of the grinding wheels, the grinding wheel works to finish the portion of the lens engaged therewith until that portion is ground down sufficiently for the template to engage the plate 136 and close the switch 134, whereupon the motor 60 is energized and rotates the work holder a small increment to bring a fresh portion of the lens against the wheel, thereby moving the frame 12 back and opening the switch 134 until said fresh portion is ground to size. In this manner, successive portions of the lens are grounded down to size during incremental advances of the lens until the edge of the lens is ground down to the intended outline, whereupon the lens will rotate continuously. Excessive grinding is, of course, prevented by virtue of the positive stop means provided by the template and the followers.

To facilitate the above described rapid grinding operations of the invention, and to insure a uniform grinding pressure, the frame 12 is yieldably urged toward the frame 14 at all times by a pair of compression springs 138 encircling the guide rods 22 between the outer abutments 24 and the bearing sleeves 26.

To move the frame 12 away from the grinding wheels and to govern movement of the frame toward said wheels, the operating means 20 includes a rotary cam 140 having a pair of radial lobes, namely, a long lobe 142 and a short lobe 144. In the starting position of the apparatus, the lobe 142 engages a cam follower 146 mounted on the frame 12 so as to move the frame a substantial distance away from the grinding wheels, thereby to facilitate mounting and removal of lenses on the work holder. Then, as the cam 140 is rotated, the lobe 142 moves away from the follower 146 permitting the frame 12 to move forwardly to bring the lens into engagement with the wheel 112. After a predetermined period of operation, the lobe 144 engages the follower 146 and backs the frame 12 off to separate the lens from the wheels and accommodate traverse of the frame 14, whereafter the lobe 144 clears the follower to permit the lens to engage the wheel 114. As shown in FIGURE 2, the portions of the cam intermediate the two lobes are normally spaced inwardly from the follower 146 and do not control the frame 12 during actual grinding. To facilitate the described relationship between the cam and the frame, the follower 146 is adjustably mounted on the frame 12. Specifically, the follower comprises a roller journalled on the end of a threaded stud 148 which extends through a sleeve 150 secured to the frame 12 and which has adjusting nuts threaded thereon to opposite sides of the sleeve.

The cam 140 is operated by means of a common cam shaft 152 paralleling the work holder shaft 40–42, the arbor 116 and the guide 96 of the second frame, the cam shaft being mounted beneath the work holder and being journalled in a pair of spaced bearings 154 secured to the base 10. The bearings 154 are preferably split bearings to facilitate removal of the cam shaft, and the latter preferably is provided with a keyway to facilitate rapid replacement or interchange of cams. To drive the shaft, an electric motor 156 with a gear reducer 158 is mounted on the base 10 beneath the frame 12, the reducer 158 and shaft 152 having aligned sprockets or toothed pulleys 160 and 162 over which a toothed belt 164 is trained. Mounted adjacent the motor is a master switch and cam assembly comprising a notched cam disc 166 on the shaft 152 and a micro-switch 168 on the base 10 having an actuator arm biased into engagement with the disc, the switch being open when its arm is engaged in the notch in the periphery of the disc and otherwise being closed by the disc. The micro-switch 168 and a motor start switch (not shown) are connected in parallel with one another and in series with the motor. The start switch may be closed momentarily to initiate operation of the motor 156, causing the cam disc 166 to rotate and close the micro-switch 168 thereby to maintain the motor 156 energized for a predetermined time by virtue of the relationship between the motor, the reducer, the sprockets and belt, the cam disc and the switch. In the illustrated embodiment of the invention, the cam disc has a single notch in its periphery and the disc 166 and the cam 140 are fixed on the shaft 152 in such relative positions that the long lobe 142 of the cam 140 engages the follower 146 when the actuator arm of the switch 168 is engaged in the notch in said disc.

Fixed to the cam shaft 152 intermediate the cam 140 and the disc 166 is a cylindrical cam 170 having a radial face defining a plurality of axially spaced cam surfaces 172 and 174 and inclined ramps 176 and 178 between said surfaces. The cam 170 is fixed on the shaft 152 with its ramps substantially aligned with the lobes of the cam 140, and with the cam surface 172 thereof furtherest from the cam 140 leading the long lobe 142 in the direction of shaft rotation. Cooperating with the cam surfaces 172–178 is a follower 180 secured to one leg 102 of the frame 14, the follower being biased into engagement with said surfaces by a compression spring 182 confined between the opposed abutment 98 and the bearing means 100 of the frame 14.

In use of the illustrated and described device, the device as a whole may be under the control of a line switch. Upon closing of such switch, the motors 60, 106 and 156 are conditioned for operation in response to closing of their respective control switches. At this time, the cam shaft 152 is in such position that the actuator arm of the switch 168 is engaged in the notch in the disc 166 and the frame 12 is fully retracted by the long lobe 142 of the cam 140. Consequently, none of the motors 60, 106 and 156 is energized.

The operator may then place a lens blank W in between the two pads 56 and 74 of the work holder and swing the handle 94 toward the left to the position shown in FIGURE 1, to clamp the lens blank in the holder. The operator then momentarily closes the start switch for the motor 156, whereafter the operation proceeds essentially automatically.

As the motor 156 is energized, the cam shaft 152 is rotated to cause the cam disc 166 to close the switch 168, whereby to close a holding circuit for the motor 156 and to energize the motor 106. Consequently, the motors 106 and 156 will continue to run until the circuits are broken by the switch arm again engaging in the disc notch. As automatic operation is initiated, the follower 180 on the second frame 14 engages the relatively depressed cam surface 172 of the face cam 170, whereby the spring 182 urges the second frame toward the right (FIGURES 1 and 3) to align the rough grinding wheel 112 with the lens blank W. The lobe 142 of the cam 140 simultaneously moves away from the follower 146, whereupon the frame 12 is urged forwardly by the springs 138 to move the blank against the grinding wheel. As previously described herein, the template 52, the follower 124, the follower switch 134 and the motor 60 function in such manner that the periphery of the blank is rough ground incrementally at high speed to the outline of the template. To equalize wear on the rough grinding wheel 112, the wheel is preferably caused to traverse the lens blank by reason of a slight incline to the cam surface 172 causing the frame 14 to move from right to left (as seen in FIGURE 1) during rough grinding.

Also, to mitigate dispersion of glass dust in the atmosphere and to accommodate wet grinding, the machine is preferably equipped with a two-part enclosure for the grinding wheels and the work, the enclosure comprising a lower half 184 fixed to the frame and enclosing the lower parts of the wheels and an upper half 186 hinged to the lower half and selectively movable into and out of enclosing relation to the wheels and the work. The lower half, of course, is so disposed as not to interfere with movement of the work, the work holder shaft and the frame 12, and the upper half has slots or like openings therein accommodating passage of the work holder. Hoses 188 may suitably be coupled to one or both of the halves 184 and 186 to facilitate use of coolants and/or liquid grinding compounds. As illustrated in FIGURES 1 and 2, the enclosure protrudes substantially beyond the work in the direction of the frame 12 for a reason to be described. In use, the upper half is swung into enclosing relation to the work, either manually or automatically, as the work is moved toward the wheel 112.

When rough grinding of the lens has been completed, the short lobe 144 of cam 140 engages the follower 146 to move the frame 12 rearwardly a short distance, which movement is accommodated by the protruding portions of the enclosure 184–186 whereby it is not necessary to open said enclosure at this stage of machine operation. As the lobe 144 backs the work away from the grinding wheels, the ramp 176 on the cam 170 engages the follower 180 to shift the frame 14 further to the left to the position defined by cam surface 174, thereby to align the finishing wheel 114 with the rough ground lens. The lobe 144 then passes the follower 146 to permit the frame to move forwardly to engage the lens with the wheel 114.

As the lens is moved into engagement with the wheel 114, it is essential that the lens be centered in the V-groove of the wheel so that the bevel to be imparted to the lens edge be exactly centered on the lens thickness. By virtue of the floating mount of the work holder carriage 34 on the first frame 12, the present invention renders the lens self-centering in the V-groove. The self-centering action is perfectly effective whether the lens be flat, concave, convex, or of any other configuration. For example, with a concavo-convex circular blank ground to elliptical shape, the edge of the ground blank undulates back and forth relative to a central plane. Even so, the springs 138 so bias the frame 12 as to retain successive portions of the lens edge centered in the V-groove, and the carriage 34 oscillates from side-to-side as dictated by the lens itself to accommodate said centered relationship. Thus successive portions of the lens edge may be finish ground to the desired final outline dictated by the template 52, and a perfect bevel can be imparted to such edge, in the same manner as the blank was successively rough ground.

When finish grinding of the lens has been completed, the long lobe 142 of the cam 140 engages the follower 146 and commences to move the frame 12 and the work holder 16 away from the finished means. At this time, the upper half 186 of the wheel enclosure is raised, manually or automatically, to accommodate unobstructed retraction of the work holder and lens, whereupon the lobe 142 causes retraction of the frame to its initial rearwardly spaced position relative to the wheels. When the frame 12 reaches its rearwardmost position, the notch in the cam disc 166 aligns with the actuator arm of the master switch 168, whereupon the motors 106 and 156 are de-energized. When using coolants or grinding compounds, the switch 168 also preferably controls operation of a pump for supplying liquid to the enclosure 184–186. The frame 12 thus stops in its rearwardmost position so that the operator may swing the handle 94 to the right, remove the finished lens from the work holder, insert a fresh blank in the holder, clamp the fresh blank in place by swinging the handle 94 back to the left, and re-start the above described automatic cycle by momentarily closing the start switch of the motor 156. In fact, the handle 94 is capable of operating the lens clamp means at such speed that a proficient operator can remove a finished lens and insert a fresh lens without stopping the machine at all. Consequently, for a proficient operator in the particular industry herein discussed, the start switch could remain closed.

For the described purposes of lens grinding, the embodiment of the machine shown in FIGURES 1 to 5 utilizes diamond wheels 112 and 114 in either of two sizes, 4 inch or 6 inch diameter, which are preferably operated at about 3500 r.p.m. The work rotating motor 60, in combination with the speed reducer 62 and the sprockets 64 and 48, is preferably such as to rotate the work at about 8 r.p.m. when the followers 124 and 126 accommodate continuous rotation of the work. The cam shaft 152 carries two sets of cam surfaces for automatically controlling two finishing operations and makes a single revolution per machine cycle. The two lobes of the cam 140 are diametrically opposed and the face cam 170 defines two cam surfaces 172 and 174, each approximately semi-circular, and a pair of diametrically opposed ramps 176 and 178 between said surfaces, thereby to provide for two finishing operations of equal duration. In this environment, the cam shaft is preferably timed, via the motor 156, reducer 158 and sprockets 160 and 162, to provide for a complete revolution of the cam shaft in about 45 to about 60 seconds. In other words, an eyeglass lens may be finished completely (both rough ground and finish ground) in only about 45 seconds with this embodiment of the machine of the present invention.

Referring now to FIGURES 6 to 16 of the drawings, I shall describe the second and commercially preferred embodiment of this invention. In such description, parts similar or identical to those above identified by reference numerals lower than 100 shall be identified by the same numerals, but in the 300 series, and those above identified by numerals in the 100 series shall be identified by the same numerals but in the 400 series.

As illustrated, the second embodiment of the machine of the invention comprises a stationary or base frame 310, a first movable frame 312 mounted on the base 310 for reciprocation along a first axis, i.e., the longitudinal axis of the base, a second movable frame 314 juxtaposed to said first frame along said first axis and mounted on said base for reciprocation along a second axis transverse to the first, preferably at right angles to the first axis, work holder means 316 on the first frame 312, finishing means 318 on the second frame 314, and means indicated generally at 320 for reciprocating the two frames along their respective axes.

The first frame 312 is reciprocably mounted on the base 310 by a pair of laterally spaced longitudinally extending guides 322, the guides being disposed at one end and adjacent the sides of the base 310 and mounted in spaced parallel relation thereto. The guides 322 are preferably hardened steel rods and the frame 312 includes tubes or sleeves 326 of a length less than said rods slidably telescoped over said rods. The sleeves 326 are joined by a traverse bottom frame wall 328 and a vertical inner frame wall 332, the latter of which extends upwardly through an opening 331 in the base 310. Above the upper wall of the base, a trim plate 333 is secured to the wall 332 to cover the opening 331 during the reciprocal movements of the frame 312.

The work holder means 316 comprises a work carriage in the form suitably of an inverted generally U-shaped member 334 slidably mounted on the upper edge of the wall 332 above the base 310 and plate 333. Specifically, a pair of shafts or rods 336 are secured to the carriage 334 and slidably mounted in bearings 335 carried at the upper edge of the wall 332. The carriage 334 is thus mounted on the frame 312 with freedom for movement transversely of the first axis (the rods 322) whereby the work carriage is free to float relative to the finishing means 318.

Mounted adjacent the forward edge of the carriage 334 is a work holder of chucking means comprising a pair of axially aligned juxtaposed shafts or chuck parts 340 and 342, shown particularly in FIGURE 9. The shaft 340 is an elongate rod journalled intermediate its ends in a bearing assembly 344 which securely mounts the shaft for free but true rotation about its axis and against endwise movement relative to the bearing. At the outboard or left end thereof (as shown in FIGURE 9) the shaft 340 is provided with an extension 341 mounted to accommodate sliding movement of the shaft relative thereto. Specifically, bearings 343 on the opposite sides of the shaft 340 are reciprocably mounted in open end slots in the extension whereby the shaft may slide in the extension as the carriage 334 floats relative to the frame 312. A sprocket wheel 348 is secured to an intermediate portion of the shaft extension 341, the wheel being stationary relative to the frame 312 and having a toothed periphery comprising a drive pulley or sprocket for the shaft and shaft extension. Preferably, a detachable shield 349 covers the sprocket.

At its outer end, the shaft extension 341 is necked-down or otherwise formed to facilitate detachable mounting in predetermined relation thereto of a template 352. The template 352 is, of course, of the outline desired for the article to be worked upon by the machine, and the illustrated template may be replaced by any of a variety of differently shaped templates for different purposes. At its inner end, the shaft 340 carries a resilient work holding pad 356 for engagement with the work piece W.

The shaft 340 is preferably mounted adjacent the forward edge of the carriage plate 334 at right angles to the axis of reciprocable movement of the plate 312 by a raised tubular portion 358 of the carriage 334 within which the bearing 344 is secured. To drive the shaft, an electric motor unit 360 is mounted on the frame 312, the motor including an output pulley or sprocket 364 aligned with the sprocket 348, and a toothed belt 366 is trained over the two sprockets to establish a positive drive for the shaft extension 341 and thus the shaft 340.

The shaft 342 is aligned axially with the shaft 340 and is provided adjacent its outboard end with an enlarged head 370. The inner end portion of the shaft is slidably and rotatably mounted in a two part bearing 368 and carries a conjointly movable end cap or chuck part 372, which cap carries a resilient work holding pad 374 juxtaposed to the pad 356 on the shaft 340.

The head 370 at the outer end of the shaft 342 is rotatably mounted in a piston 380 which in turn is slidably mounted in a tubular portion 384 of the carriage 334 corresponding to and aligned axially with the portion 358 which supports the shaft 340. The bearing 368 is also supported in the portion 384.

To provide for positive conjoint rotation of the two chuck parts or shafts 340 and 342 (which I have found to be desirable), I equip each with a sprocket 375 over each of which is reaved a toothed belt 376 or the like. Each belt is also reaved over a respective sprocket 377 secured to a transmission shaft 378, which generally parallels but is spaced below the chucking means or shafts 340–342, and which is preferably disposed below the carriage 334. The shaft 378 is slidably mounted in bearings 379 on the carriage 334, whereby the shaft is free for self-aligning movement relative to the sprockets 375. By virtue of the described assembly, the extension 341 and shaft 340, which are driven by the motor 360, positively drive the shaft 378 and it in turn positively drives the shaft 342, whereby the shafts 340 and 342 are effectively locked together for conjoint rotation.

The shaft 342 nevertheless is mounted by the piston 380 for reciprocating movement relative to the shaft 340. At the end thereof opposite the head 370 on the shaft 342, the piston 380 is provided with an internal recess within which a compression spring 388 is seated, the spring suitably having a strength in the order of about 40 to about 100 pounds and being adjustable by a screw and follower assembly 387 threaded into the outer end wall of the tubular portion 384.

The piston 380 includes a lateral extension or rod which projects outwardly through a slot in the tubular portion 384 for engagement by a cam 392 in the form of a collar encircling and rotatably mounted on the tubular portion 384. As shown in FIGURE 6, the collar 392 includes a V-shaped cam portion 393 acting between two roller bearings 389 and 391, the left hand one of which is mounted on the tube 384 and the right hand one of which is mounted on and forms part of the lateral extension of piston 380. The cam 392 is provided with a handle 394 whereby the cam may be swung about the axis of the tube 384 from a lens locking position, wherein the handle is upright, to a lens releasing position wherein the handle projects toward the front of the machine. Specifically, as the handle is moved from the latter position toward its upright position, the cam 393 releases the roller 391 whereupon the spring 388 will move the piston 380 and the shaft 342 to the left (as viewed in FIGURE 9) to bring the pad 374 into engagement with the work piece W, such as an eyeglass lens, to clamp the work piece between the two pads 356 and 374 at the adjacent ends of the two chuck parts or shafts 340 and 342. In this manner, the work piece is firmly clamped in position but can never be subjected to a force beyond the compressive force of the spring 388.

A simple upward push on the handle 394, together with the assisting action of the spring 388 relative to the cam portion 393, thus effects clamping of the work piece between the two shafts, and a downward swing of the handle quickly retracts the piston 380 and shaft 342 to release the work piece from the holder or chuck means.

To perform successive edge finishing operations on the thus mounted work piece, the finishing means 318 is mounted on the second frame 314 in juxtaposition to the work piece, and the frame is slidably mounted on the base 310 for movement at right angles to the frame 312, i.e., parallel to the work holder shaft 340–342, to align the finishing instrumentalities selectively with the work. The second frame 314 is comprised essentially of the casing and base plate of an electric drive motor 406 for the finishing means 318, and two pairs of bearings 400 on the lower side of the base plate which are slidably mounted, respectively, on a pair of transverse guides 396 mounted in spaced parallel relation on the base 310. The guides 396 are mounted by uprights 398 on a plate 399 that is secured to the base 310. The guides 396 and bearing means 400, like the guide and bearing assemblies 322–326, preferably comprise hardened steel shafts or rods and slide, water pump or die guide bearings having hardened steel balls riding on the rods.

The finishing means 318 provided for edging eyeglass lenses comprises a pair of rotary grinding wheels 412 and 414, preferably diamond wheels, mounted side-by-side on the output shaft of the motor 406. In the present embodiment of the invention, the wheels 412 and 414 and the motor 406 are disposed on a common axis which is set at an acute angle, preferably in the order of about 45 degrees, to the axis of the work holder or chucking means 340–342, for the particular purposes set forth in Patent 2,674,068, issued Apr. 6, 1954. The two wheels are mounted with the finishing surfaces thereof transverse to the edge of the work piece W, i.e., with their peripheries opposed to the work. Specifically, the roughing wheel 412 has a smooth periphery set at an angle of about 45 degrees to the axis of the wheel and essentially normal to the edge of the work. The wheel 414 has in its periphery a beveling V-groove of about 115 degrees arc in cross section, the bisector of the V being disposed at an angle of about 45 degrees to the wheel axis and essentially normal to the axis of the work holder.

As will presently be described, the frame 312 and the frame 314 have essentially the same sequence of movements as described for the frames 12 and 14, whereby the work is first engaged with the wheel 412 for an initial rough grind, and is then engaged with the wheel 414 for a finish grind, which due to the V-groove forms a bevel on the edge of the lens. To guide the lens W for formation of a predetermined outline or edge configuration, a template 352 of the desired outline is affixed to the end of the work holder shaft extension 341 for cooperation with template follower means 423 correlated to the wheels 412 and 414.

As shown in FIGURES 6 and 12 to 16, the follower means 423 is comprised of a switch 434 carried by a bracket 428 which is adjustably carried by a micrometer 430. The micrometer in turn is adjustably mounted on a slide way 429 formed on an extension 431 of the finishing instrumentality frame 314 and cooperates with an adjustable scale 432 thereon. The switch 434 is adapted to be actuated by means of a hinged plate 436 which is pivotally mounted on the bracket 428 forwardly of the switch. The plate 436 carries directly thereon a finish operation follower pad 426 and adjustably mounts a roughing operation follower pad 424.

The micrometer 430 is adjustable on the frame 314 to facilitate a "zero" setting of the finish follower pad 426 relative to the finish wheel 414, thereby to compensate for size variations, wear, replacement, etc., of the finish wheel. When the adjustment has been made (with the micrometer itself set to zero) the scale plate 432 is set to zero to designate the correct zero position of the follower means.

The roughing follower pad 424 is comprised of a pad face and a pair of rearwardly extending pins 425 which pass slidably through the hinge plate 436. The pad may thus be adjusted to its own "zero" position relative to the roughing wheel 412, as by means of a set screw 427 threaded through the plate 436 and engaging the rear face of the pad centrally between the pins 425.

According to the present invention, the slidable assembly of the rough finish pad 424 affords a further and marked advantage. In a practical commercial structure, a lens grinding machine is required to edge lenses throughout a broad range from very thin to very thick or heavy minus lenses. As the lenses are roughed down toward finish size, it is desirable to use a coarse grit or particle to perform the work as rapidly as possible, and this results in chipping the edge of the lens. With thick or heavy minus lenses, the chipping is relatively shallow—as a rule less than one millimeter. With a thin lens, however, the chipping as a rule is two millimeters and frequently up to almost three millimeters in radial extent. Thus, it has been the practice with all lenses to rough grind to within about three millimeters of final dimensions and to grind away the final three millimeters on the finish wheel. According to the present invention, the abuse of the finish wheel and the slowness of finishing when working with thick lens resulting from the prior practices are eliminated.

Specifically, referring to FIGURES 13 and 14, the pins 425 of the pad 424 are extended slidably through the plate 436 and the pad is biased rearwardly against the set screw 427 by a pair of springs 433 encircling the pins between the plate 436 and cotter keys provided at the rearward ends of the pins. Thus, the plate 424 is reciprocable relative to the hinge plate 436 against the bias of the springs 433.

Interposed between the pad and the plate, and slidably mounted on the pins 425, is a thin, plate-like mounting member 525 against which the set screw 427 abuts to adjust the position of this member and the pad 424. The member 525 includes a lateral extension projecting outwardly beyond the confines of the pad 424 on which is pivotally mounted a cam plate 527 having a thickness of two millimeters. With the cam plate 527 swung in between the pad 424 and the member 525, as shown in FIGURE 14, the pad is adjusted to the conventional relationship with the roughing wheel, i.e., to accommodate roughing to within about three millimeters of final dimensions. Thus, the pad 424 is properly set for roughing thin lenses. Then, by swinging the cam plate 527 out to the side, as illustrated in FIGURE 13, the pad 424 is automatically moved inward by the springs 433 to attain a setting affording only one millimeter clearance, which I have found to be ideal for the roughing of thick lenses. Thus, grinding of the latter can be carried out much faster than heretofore, and with considerably less wear of the final finish or V-groove wheel 414.

As will be appreciated, the micrometer 430 is adjustable by the standard knob thereof to adjust the position of the follower pads relative to the template in accordance with template size and the final dimensions of the lens, all as is well known in the art. To facilitate fast, accurate setting of the micrometer, the machine of the invention may include, as an optional feature, a fine adjustment attachment comprised, as shown in FIGURES 15 and 16, of a fairly large diameter dial wheel 530 having fine graduations thereon, a toothed belt 531 positively interconnecting the dial wheel and the input shaft or knob of the micrometer for conjoint rotation, and a bracket 532 secured to the case of the micrometer and mounting the dial wheel with its axis in spaced parallel relation to the micrometer; the bracket including a zero pointer 533 for cooperation with the graduations on the wheel.

As with the first described embodiment of the invention, the two follower pads 424 and 426 are spaced laterally from the respective finishing instrumentalities by a distance equal to the spacing between the template 352 and the lens W, whereby the follower 424 is aligned with the template when the lens is aligned with the rough grinding wheel 412 and the follower 425 is aligned with the template when the lens is aligned with the finishing wheel 414. The switch 434 is connected in series with the drive motor 360 for the work holder, whereby said motor is energized and the lens is rotated only when the template engages a respective follower pad and closes the switch 434. Consequently, when the frame 312 is moved to engage the lens W with either of the grinding wheels, the grinding wheel works to finish the portion of the lens engaged therewith until that portion is ground down sufficiently for the template to engage the follower pad and close the switch, whereupon the motor 360 is energized and rotates the work holder a small increment to bring a fresh portion of the lens against the wheel, thereby moving the frame 312 back and opening the switch 434 until said fresh portion is ground to size. In this manner, successive portions of the lens are ground down to size during incremental advances of the lens until the edge of the lens is ground down to the intended outline, whereupon the lens will rotate continuously. Excessive grinding is, of course, prevented by virtue of the positive stop means provided by the template and the follower means.

To facilitate the above described rapid grinding operations, and to insure a uniform grinding pressure, the frame 312 is yieldably urged toward the frame 314 at all times by a pair of tension springs 438 extending between the frame 312 and a rearward portion of the base 310.

To effect and/or govern the relative movements of the frames 312 and 314, the operating means 320 is mounted on the lower portions of the frame 312 within the confines of the base 312, and is thus reciprocable longitudinally of the guides 322 with the frame 312.

To move the frame 312 away from the grinding wheels and to govern movement of the frame toward said wheels, the operating means 320 includes a rotary cam 440 having a pair of radial lobes, namely, a long lobe 442 and a short lobe 444. In the starting position of the apparatus, the lobe 442 engages a cam follower 446 mounted on the base 310 so as to move the frame a substantial distance away from the grinding wheels, thereby to facilitate mounting and removal of lenses on the work holder. Preferably, the follower 446 comprises a roller mounted at the end of a rod that is adjustably mounted in a guide collar 448 on the plate 399 forming part of the base 310, the collar and rod facilitating initial adjustment of the movement of the frame 312 away from the finishing means 318 and being locked in adjusted position by a set screw 450. When the cam 440 is rotated, the lobe 442 moves away from the follower 446 permitting the frame 312 to move forwardly to bring the lens into engagement with the wheel 412. After a predetermined period of operation, the lobe 444 engages the follower 446 and backs the frame 312 off to separate the lens from the wheels and accommodate traverse of the frame 314, whereafter the lobe 444 clears the follower to permit the lens to engage the wheel 414. The portions of the cam intermediate the two lobes are normally spaced inwardly from the follower 446 and do not control the frame 312 during actual grinding.

When the lobe 442 is again brought into engagement with the follower 446, and the bump or projection constituting its outermost point is aligned with the follower, the frame 312 is backed away from the finishing instrumentalities by a distance sufficient to bring a spring-pressed abutment 466 on the frame 312 into engagement with a switch actuating lever 467 which is mounted on the front wall of the base 310 in operative association with a normally closed on-off switch 468, thereby to operate the switch to "off" or circuit opening position. In this manner, the machine is automatically shut-off after one complete revolution of the cam 440, which as will presently appear constitutes one complete cycle of machine operation wherein a lens is rough ground and finish bevel ground.

To initiate another cycle of machine operation, it is only necessary for the operator to press inwardly on the lever 467, through the expedient of a manual control knob 469 mounted on the lever and projecting through the front face of the base 310. Inward movement of the lever depresses the spring-pressed abutment 466 and releases the switch 468 to "on" position to supply current to the motor 360, whereupon the lobe cam 440 is rotated to accommodate inward movement of the frame 312 and thus separation of the abutment 466 from the switch so that the switch remains "on."

Referring to FIGURES 7 and 8, the lever 467 is pivotally mounted at one end on a pin 565 secured to the front wall of the base and the operating knob 469 thereof comprises a pin at the other end of the lever projecting through a slot in the front wall of the base. Compression springs 566 encircle both pins normally to bias the lever away from the switch 468, thereby to retain the switch normally in its "on" position. At a location thereon below the switch, the lever is provided with a protrusion 568 which can be swung into alignment with the switch and which is of a dimension approximately equal to the differential in length or radial extent between the two lobes 442 and 444 of the cam 440. By swinging the lever operating knob 469 upwardly when initiating a machine cycle, the protrusion 568 is aligned with the switch 468 and is thus located to operate the switch to "off" position when the cam lobe 444 engages the follower 446, thereby automatically to shut the machine "off" at the end of the rough grinding operation whenever the operator should deem this desirable or necessary.

In the present embodiment of the invention, I have as a particular object totally automatic operation of the machine as a function of completion of each of its intended finishing functions, rather than elapse of a predetermined period of time. In this manner, relatively thin, relatively thick, relatively soft and relatively hard work pieces can all be finished, with finishing instrumentalities that are in excellent, fair or poor condition, as rapidly as possible under the particular set of conditions with complete assurance that the work will be done completely and accurately. To this end, I have provided (a) common drive means for both the cam assembly and the work holder, and (b) have made operation of said means reliant primarily on the template follower switch means 423, whereby the cam assembly can perform its frame moving functions only after completion of each work finishing function.

Specifically, the cam 440 is mounted on and rotated by a common cam shaft 452 paralleling the work holder shaft 340–342, the cam shaft being mounted beneath the work holder and journalled in a bearing 454 secured to the frame 312. To drive the shaft, the electric motor 360 (which also drives the work holder) is provided with a pinion 460 meshed with a gear 462 provided on the adjacent end of the cam shaft 452.

Energization of the motor 360 is controlled by a parallel array of the template follower switch 434 and a second switch 540, which array is connected in series between the switch 468 and the motor. Said second switch 540 preferably comprises a normally "off" microswitch mounted on the base 312 and engageable with one side surface of the lobe cam 440, as shown in FIGURE 7. The lobe cam has cut-out portions 542 and 544 in its hub portion which accommodate entry therein of the actuator of the switch 540, thereby to retain the switch "off" when lobes 442 and 444 are spaced from the follower and permit the work to be engaged with the grinding wheels. Thus, when the work is engaged with either grinding wheel, energization of the motor is under the control of the template follower switch 434, whereby the work and the cams are rotated only as successive portions of the work are ground down to size. Preferably, the drive and cam ratios are such that the work piece must make at least one complete revolution in the rough grinding operation and about one and one-half revolutions in the finishing grinding operation under the exclusive control of the template follower switch.

To accommodate the variation between rough and finish grinding, the cam lobes 442 and 444 are not set diametrically opposite one another, as will be appreciated from FIGURE 7. In the preferred embodiment of the invention, I employ a 6 r.p.m. motor, a drive ratio of 2:3 between the motor and the work holder and a drive ratio of 4:1 between the motor and the cam shaft. In this manner, the work holder is required to perform six revolutions per revolution of the cam shaft—about one and one-fourth revolutions in roughing, about two and one-half revolutions in finishing and the remainder to accommodate translatory movement of the work and the grinding wheels.

The cut out portions 542 and 544 in the hub of the cam 440 are such in relation to the rotary and reciprocatory movements of the cam and the placement of the switch 540 that the non-cut away portions close the switch 540 in the intervals between the rough and finishing grinding operations. Thus, the switch 540, being in parallel with the switch 434, energizes the motor at all times that the cam lobes engage their follower 446, whereby to rotate the cam assembly during the intervals the frames 312 and 314 are required to make translatory movements.

By virtue of the above described control arrangement, the machine operates primarily as a function of the speed at which a given work piece can be finished to size by the particular finishing intrumentalities then in use; the translatory movements of the two frames being effected at constant speed under the control of switch 540 and requiring less than 15 seconds in the structural assembly above described. In general, using good diamond grinding wheels and the template adjustment means of FIGURES 13–14, an eyeglass lens, whether thick or thin, can be formed and finished with an accurate beveled edge in about 30 seconds elapsed time for a complete machine cycle.

If, desired, the speed of motor 360 and thus of the entire lens finishing cycle can be rendered adjustable by a rheostat or variable resistor coupled in series with the motor. For this purpose, it is preferable, as is known in the art, to convert the supplied power to D.C. and to utilize a D.C. motor. In general, the higher speeds, e.g. 6 r.p.m., would be used for thinner lenses and the lower speeds, e.g. 4 r.p.m., would be used for thicker lenses, whereby the thicker lens would be ground in smaller increments with a total grinding cycle of about 45 seconds.

As above described, the translatory movements of the frame 312 are governed by the lobes of cam 440, and while these movements are being effected, the frame 314 is subject to translatory movement under the control of a cam 470 which is also fixed to the shaft 452.

The cam 470, which is cylindrical, has a radial face defining a plurality of axially spaced cam surfaces 472 and 474 and inclined ramps 476 and 478 between said surfaces. The cam 470 is fixed on the shaft 452 with its ramps substantially aligned with the lobes of the cam 440, and with the cam surface 472 thereof furthest from the cam 440 leading the long lobe 442 in the direction of shaft rotation. Cooperating with the cam surfaces 472–478 is a roller equipped first end of a follower 480, in the form generally of a bell crank, which is pivotally mounted intermediate its ends on the base 310 and which, at its opposite end, engages an upright roller 481 on the base portions of the frame 314. The roller 481 is biased into engagement with the follower 480, and the follower in turn is biased into engagement with the cam surfaces 472–478 by a compression spring 482 confined between a collar on one of the guides 396 and the adjacent bearing means 400 of the frame 314.

The surface 472 of the cam 470 is correlated to the roughing wheel 412 and has an inclined surface to effect relative traversing of the roughing wheel and the work during rough grinding whereby to eliminate localized wear of the roughing wheel.

Aligned with the cam surface 472 is a third cam 570 which is secured to the shaft 452 between the cams 440 and 470, the cam 570 having an arcuate operable extent approximately equal to that of the surface 472, as is shown in FIGURE 7. Engaged with this cam is a crank shaped follower 580 which is pivotal on the frame 312 and includes a portion extending upwardly through a hole in the cover plate 333 to a point adjacent the lower edge of the work holder carriage 334. As shown in FIGURES 7 and 9, the upper end of the follower 580 terminates in a point adapted to enter into a complemental notch 581 in the carriage 334 for locking the carriage against floating movement during the aforesaid traversing movement of the roughing wheel, thereby to assure relative traverse of the wheel and the work. To withdraw the point from the carriage and to maintain the follower 580 in contact with the cam 570, a spring 582 is associated with the follower.

In use and operation of the second embodiment of the machine of this invention, the normal at rest position of the components is shown in FIGURES 7 and 9, in which position the motors 360 and 406 are de-energized.

The operator may then place a lens blank W between the two pads 356 and 374 of the work holder and swing the handle 394 upwardly to clamp the lens blank in the holder. The operator then momentarily pushes in on the start switch knob 469, whereafter the operation proceeds essentially automatically.

Closing of the switch 468 by inward depression of the knob 469, results in energization of the work moving motor 360, the grinding wheel motor 406 and the motor for a grinding lubricant pump if one is provided. The latter two motors will continue to run until the master circuit is broken by opening of the switch 468. As automatic operation is initiated, and the cams are rotated in a counterclockwise direction as viewed in FIGURE 7, the follower 480 on the second frame 314 is caused to ride down the ramp 476 and into engagement with the relatively depressed cam surface 474 of the face cam 470, whereby the spring 482 urges the second frame toward the right (FIGURES 6 and 10) to align the rough grinding wheel 412 with the lens blank W. Also, the cam 570 moves the follower 580 outwardly and upwardly to engage the same with the carriage 334 to lock the carriage against floating movement. Then, the lobe 442 of the cam 440 moves away from the follower 446, whereupon the frame 312 is urged forwardly by the springs 438 to move the blank against the grinding wheel. At this time, the switch 540 is opened. As previously described herein, the template 352, the follower 424, the follower switch 434 and the motor 360 thereafter function in such manner that the periphery of the blank is rough ground incrementally at high speed to the outline of the template. As this occurs, the rough grinding wheel 412 traverses the lens blank by reason of the slight incline imparted to the came surface 474 causing the frame 314 to move from right to left.

To mitigate dispersion of glass dust in the atmosphere and to accommodate wet grinding, the machine is preferably equipped with a two-part enclosure for the grinding wheels and the work, the enclosure comprising a main portion 484 fixed to the frame 314 and enclosing the wheels and an upper portion 486 hinged to the lower portion and selectively movable into and out of enclosing relation to the wheels and the work. The two portions are so disposed and of such size as to accommodate the relative movements of the work and the two wheels in the normal cycle of machine operations, and the lower portion 484 is provided with large holes 485 accommodating the work holder and its movements. Preferably, flexible seals 487 are provided to close such holes (see FIGURE 6). Hoses 488 may suitably be coupled to one or both of the portions 484 and 486 to facilitate use of coolants and/or liquid grinding compounds.

When rough grinding of the lens has been completed, and the short lobe 444 of cam 440 is about to engage the follower 446, the lobe cam switch 540 is again closed to effect operation of the motor 360 during translatory movement of the two frames. As previously described, the machine can be stopped automatically after the rough grinding step simply by raising the knob 469. Whether the machine be stopped and then restarted, or whether it continues through a full automatic cycle, the ramp 478 on the cam 470 acts on the follower 480 while the work is held away from the grinding wheels by the lobe 444 to shift the frame 314 further to the left to the position defined by cam surface 472, thereby to align the finishing wheel 414 with the rough ground lens. The lobe 444 then passes the follower 446 to permit the frame 312 to move forwardly to engage the lens with the wheel 414. As this occurs, the switch 540 is opened, thereby leaving motor 360 under the control of the template follower.

As the lens is moved into engagement with the wheel 414, it is generally desirable that the lens be centered in the V-groove of the wheel so that the bevel to be imparted to the lens edge be exactly centered on the lens thickness. By virtue of the floating mount of the work holder carriage 334 on the first frame 312, the present invention renders the lens self-centering in the V-groove. The self-centering action is perfectly effective whether the lens be flat, concave, convex, or of any other configuration. For example, with a concavo-convex circular blank ground to elliptical shape, the edge of the ground blank undulates back and forth relative to a central plane. Even so, successive portions of the lens edge remain centered in the V-groove, and the carriage 334 oscillates from side-to-side as dictated by the lens itself to accommodate said centered relationship. Thus, successive portions of the lens edge may be finish ground to the desired final outline dictated by the template 352, in the same manner as the blank was successively rough ground, and a centered bevel is imparted to such edge.

When working with thick or heavy minus lenses, it is usually desirable, for cosmetic reasons, to have as little as possible of the beveling show at the front face of the lens. To this end, thick lenses are preferably ground with the bevel closer to the front of the lens, rather than centered on the thickness of the lens, which requires positive control of the position of the lens relative to the V-groove of the wheel 414. For this purpose, I provide a cam 590 pivotally mounted on the base 310 and having a curved surface 591 cooperable with the work holder carriage 334 for holding the same in predetermined relation to the V-groove of the wheel.

Specifically, the cam 590 is pivotally mounted on a micrometer 592 for precise location of the cam surface thereof relative to the V-groove of the wheel, the micrometer being mounted on the machine base 310. The cam surface 591 is disposed for engagement by a roller 593 mounted on an extending portion of the carriage 334, so that as the carriage moves in and out as dictated by the template 352 the carriage also moves laterally in accordance with the dictates of the cam surface 591. This surface is curved in conformity to the customary curvature of the major planar axis of meniscus shaped lenses so that the point of the bevel has a given location relative to the face of the lens despite the particular form or outline of the lens as dictated by the template.

Since I prefer to traverse the wheel relative to the lens during roughing, and the cam 590 serves no useful function during roughing, I associate a spring or the like (not shown) with the pivot of the cam normally to swing the same out of the way of the roller 593. Then, when the wheels are shifted laterally of the work to align the V-groove wheel with the lens, a reminder roller 595 carried by the frame 314 engages the cam to swing the same into operative position relative to the follower roller 593, whereby the carriage follows the cam surface 591 during finishing only.

Specifically, as the lens moves into the V-groove in the wheel, and attempts to reach a centered position therein, the carriage is continually pulled to the left to maintain the roller 593 in engagement with the cam 591. When grinding lenses other than exceptionally thick ones, the cam 590 is preferably swung or moved to an inoperative position relative to the rollers 593 and 595, whereby the bevel will be centered on the lens.

When finish grinding of the lens has been completed, the long lobe 442 of the cam 440 engages the follower 446 and commences to move the frame 312 and the work holder 316 away from the finishing means. When the frame reaches its rearwardmost position, the abutment 466 engages the lever 467 to open the switch 468, whereupon the motors 360 and 406 are de-energized. When using coolants or grinding compounds, the switch 468 also controls operation of a pump for supplying liquid to the enclosure 484–486. The machine thus stops when the frame 312 is in its rearwardmost position so that the operator may open the enclosure 486, swing the handle 394 downwardly, remove the finished lens from the work holder, or chucking means, insert a fresh blank in the chuck or holder, clamp the fresh blank in place by swinging the handle 394 upwardly, close the enclosure and re-start the above described automatic cycle by momentarily pushing inward on the start switch knob 469.

A particular problem that has existed heretofore in the art, and one that has introduced considerable loss of time into the manual operation of inserting a lens blank in the chuck or work holder, is that concerning proper alignment of the blank with the chucking means 340–342, and the template 352. Specifically, a lens has an optical axis or center that must be precisely aligned with the axes of the chucking means and a major transverse axis that must be aligned with the corresponding axis of the template if the lens is to perform its intended function of assisting a person's eyesight. It is conventional in the trade to designate these axes on the lens blank by removable markings applied before the lens is ground. For example, as shown in FIGURE 19, a cross hair OA may be applied to the lens to designate its optical axis or center and a pair of spaced dots TA may be applied to the lens in correlation to one another and the cross hair to designate the major transverse axis. Many proposals have been heretofore to facilitate alignment of the center OA with the axis of rotation of the chucking means, and the transverse axis TA with the major transverse axis of the template. However, none has proven satisfactory.

According to the present invention, a solution to the aforesaid problem is provided whereby lenses can be quickly and accurately chucked without delay and whereby production can be substantially increased. Referring to FIGURES 17 to 20, I provide the chuck part or shaft 340 with a configured or non-circular peripheral portion 600 immediately adjacent the face or pad 356 thereon that is intended to engage the convex surface of the lens W. The portion 600, which may suitably comprise opposed flats milled into the periphery of the shaft 340, has a specific predetermined relationship to the template 352, so as to predetermine the relative location of the major axis of the template. In this respect, it is conventional in the art to provide on the template end of the chuck part, i.e., on the outer end of the extension 341, means whereby templates may be mounted only in a predetermined relation to the chuck shaft. Since this means is conventional, it is not specifically illustrated. In the embodiment of the invention shown in FIGURES 17 to 20, the non-circular portion 600 of the shaft is disposed with the flats thereof substantially perpendicular to the major axis of any template that may be mounted on the chuck.

Associated with the machine of the invention, for example, on or adjacent the front portion of the base 310 (FIGURE 6), is an aligning member 602 similar to the chuck part 340, the member specifically including a lens engaging face 604 and an adjacent configured or non-circular peripheral portion 606 corresponding respectively to the face 356 and the portion 600 of the chuck part 340. In the center of the chucking face 604 thereof, the member 602 is provided with means delineating the chucking axis or center of the member with which the hair line OA marking the optical axis of the lens is to be aligned. The center delineating means in the preferred embodiment of the invention comprises an axial bore 608 through the member 602, which bore is preferably illuminated by a light source disposed below the member, for example within the base 310.

Cooperative with the member 602, the chuck part 340 and the lens W is a manually operated clamp 610 comprising a pair of pivotally interconnected opposed clamp elements 612 and 614, each including a jaw and an integral handle; the two jaws being biased together and the two handles being biased apart by a torsion spring 616 associated with the pivot between the two members. The jaw 618 of the lower member 612 is formed complemental to the configured portions 600 and 606 of the chuck part and the aligning member and with freedom for rapid association with and disassociation from both members. In the preferred embodiment, the jaw 618 is essentially U-shaped, including opposed legs conformed to and engageable with the flats constituting the portions 600 and 606, and a semi-circular bight portion conformed to and engageable with the part of the member intermediate the two flats. The jaw 618 is preferably sufficiently thick that the upper surface of the legs and bight thereof form a clamping surface for engagement with the convex face of the lens W; portions of the two legs being stepped or slotted to facilitate relative passage of the end face portion of the member 602 and the chuck part 340. By virtue of the U-shaped structure, the lower jaw 618 can be slidably associated with both the member 602 and the chuck part 340 with particular ease and speed, and in a single, positively determined position relative thereto.

The jaw portion of the upper clamp member 614 is comprised of a pair of clamp fingers 620 spaced equal distances to opposite sides of the center line of the U-shaped lower jaw and extending to substantially the center of the circle defined in part by the bight of the U, the two fingers being spaced apart by approximately the spacing of the transverse axis defining dots TA on the lens.

In use, the operator squeezes the handles of the clamp 610 to open the jaws, and slides the lower jaw 618 onto the configured portion 606 of the aligning member 602. With his other hand, he slides a lens blank into the space between the face 604 of the aligning member and the upper jaw fingers 620, aligns the lens center OA with the hole 608, lowers the jaw fingers 620 by relaxing his grip on the clamp handles, and rotates the lens to bring the two dots TA into corresponding positions relative to the ends of the respective fingers 620 while maintaining the center of the lens in alignment with the center of the member 602. By further relaxing his grip on the handles, the fingers are lowered into firm engagement with the lens and confine the lens between the two jaws of the clamp in predetermined relation thereto.

The above mounting of the lens in the clamp is preferably done by the operator while the machine is automatically performing its grinding functions on a lens blank previously chucked in the machine. When this lens is completed, and the machine automatically shuts off, the operator may leave the clamp and the clamped lens in position on the aligning member, flip up the enclosure 486, pull down the chuck handle 394 and remove the finished lens. Then, he slides the clamp and the lens off the aligning member and transfer the same to the chuck part 340. As the U-shaped jaw 618 of the clamp is slid on to the configured portion 600 of the chuck part 340, the lens retains its adjusted position relative to the clamp and is therefore brought into precise alignment with both the axis of the chucking means and the transverse axis of the template 352. The operator then flips up the chuck handle 394 to secure the lens within the chuck, whereafter he may squeeze on the clamp handles to open the clamp jaws and slidably remove the clamp from the chuck part, lower the cover 486 and push in on the control knob 469 to start a new cycle of machine operation.

During automatic performance of the new cycle by the machine, the operator may associate a further lens blank with the clamp so as to be prepared to insert a fresh blank in the machine when it next comes to a stop. Thus, it is seen that the apparatus illustrated in FIGURES 17 through 20 facilitates rapid and accurate mounting of lens blanks in the chucking apparatus to facilitate proper grinding of each lens. While described particularly in conjunction with the embodiment of the machine shown in FIGURES 6 through 8, it is obvious that my lens clamping and mounting means is equally applicable to both disclosed embodiments of my machine.

While I have described hereinbefore preferred structural details for my machine and a preferred field of applicability thereof, it will be apparent to those of reasonable skill in the art that both embodiments of the machine may be operated under different conditions and at different speeds than those above indicated, and that the cams may be constructed (in manner obvious from the foregoing) to provide two, three or more finishing stages of equal or different durations. The finishing instrumentalities may be varied as required for particular purposes. The invention, of course, is not limited to the finishing of eyeglass lenses or to grinding, and may be applied to a variety of forming and sizing operations, such as formation of sapphire bearings, carbide tool tips, etc.

From the foregoing, it is apparent that the present invention provides an extremely compact, economical and fully automated machine for forming and sizing articles of manufacture; the machine utilizing a plurality of finishing instrumentalities to assure accurate formation and precise sizing of the articles to a predetermined configuration by the finishing means best suited for the individual purpose. Consequently, it is submitted that all of the objects and advantages of the invention have been shown herein to be attained in a convenient, economical and practical manner.

While I have illustrated and described what I regard to be the preferred embodiments of my invention, it will be appreciated that various changes, rearrangements and modifications may be made therein without departing from the scope of the invention, as defined by the appended claims.

I claim:

1. A forming and sizing machine comprising a first frame reciprocable along a first axis, a second frame reciprocable along a second axis transverse to the first axis, work holder means on one of said frames for holding a work piece generally parallel to said first axis, a plurality of finishing means mounted generally in side-by-side relation to one another on the other of said frames with the finishing surfaces thereof transverse to said first axis, and means for reciprocating said frames along their respective axes in timed relation to one another to bring a work piece into engagement selectively with each of said finishing means.

2. A forming and sizing machine comprising a first frame reciprocable along a first axis, a second frame juxtaposed along said first axis to said first frame and reciprocable along a second axis transverse to the first axis, a work carriage floatingly mounted on one of said frames for adjusting movement transversely of said first axis, work holder means on said carriage for holding a work piece generally parallel to said first axis, a plurality of finishing means mounted generally in side-by-side relation to one another on the other of said frames with the finishing surfaces thereof transverse to said first axis, and means for reciprocating said frames along their respective axes in timed relation to one another to bring a work piece into engagement selectively with each of said finishing means.

3. A forming and sizing machine comprising a first frame reciprocable along a first axis, a second frame located along said first axis in juxtaposition to said first frame and reciprocable along a second axis transverse to the first axis, a work carriage floatingly mounted on one of said frames for adjusting movement transversely of said first axis, a work holder journalled on said carriage including means for holding a workpiece generally parallel to said first axis, means for rotating said work holder, finishing instrumentalities mounted side-by-side on the other of said frames with the finishing surfaces thereof transverse to said first axis, and means for reciprocating said frames along their respective axes in timed relation to one another to bring a work piece into engagement selectively with each of said instrumentalities.

4. A forming and sizing machine comprising a first frame reciprocably along a first axis, a second frame located along said first axis in juxtaposition to said first frame and reciprocable along a second axis transverse to said first axis, a work carriage floatingly mounted on one of said frames for adjusting movement transversely of said first axis, a work holder journalled on said carriage including means for holding a work piece generally parallel to said first axis, means for rotating said work holder, a plurality of rotary finishing instrumentalities mounted generally in side-by-side relation to one another on the other of said frames with the finishing surfaces thereof transverse to said first axis, means for rotating said instrumentalities, and means for reciprocating said frames along their respective axes in timed relation to one another to bring a work piece into the engagement selectively with each of said instrumentalities.

5. A forming and sizing machine comprising a first frame reciprocable along a first axis, a second frame located along said first axis in juxtaposition to said first frame and reciprocable along a second axis transverse to the first axis, work holder means journalled on one of said frames including means for holding a work piece generally parallel of said first axis, means for rotating said work holder means, finishing instrumentalities mounted side-by-side on the other of said frames with the finishing surfaces thereof transverse to said first axis, means for reciprocating said frames along their respective axes in timed relation to one another to bring a work piece into engagement selectively with each of said instrumentalities, a template on said work holder means rotatable therewith, and switch means on said other frame connected to and governing operation of said means for rotating said work holder means, said switch means being located in correlation to said instrumentalities and for engagement by said template to cause rotation of said work holder means as successive portions of a work piece are finished down to size.

6. A forming and sizing machine comprising a first frame reciprocable along a first axis, a second frame located along said first axis in juxtaposition to said first frame and reciprocable along a second axis transverse to the first axis, work holder means journalled on one of said frames for holding a work piece generally parallel to said first axis, means for rotating said work holder means, a plurality of finishing instrumentalities mounted side-by-side on the other of said frames with the finishing surfaces thereof transverse to said first axis, means for reciprocating said frames along their respective axes in timed relation to one another to bring a work piece into engagement selectively with each of said instrumentalities, a template on said work holder means rotatable therewith, and a combined stop and switch assembly mounted on said other frame, said assembly including a plurality of switches located in correlation with respective ones of said finishing instrumentalities and for selective engagement by said template, said switches being connected to and governing operation of said means for rotating said work holder means to cause rotation of said work holder means as successive portions of the work piece are finished down to size by the respective instrumentality.

7. In a forming and sizing machine as set forth in claim 6, said assembly including means for independently adjusting the location of each of said switches.

8. A forming and sizing machine comprising a first frame reciprocable along a first axis, a second frame located along said first axis in juxtaposition to said first frame and reciprocable along a second axis transverse to the first axis, work holder means on one of said frames for holding a work piece generally parallel to said first axis, a plurality of finishing means mounted on the other of said frames with the finishing surfaces thereof transverse to said first axis, and means for reciprocating said frames along their respective axes in timed relation to one another to bring a work piece into engagement selectively with each of said finishing means, the last-named means comprising first cam means for moving said first frame along said first axis toward and away from said second frame and second cam means having a predetermined relation to said first cam means for moving said second frame along said second axis during the time said first frame is moved away from said second frame by said first cam means.

9. A forming and sizing machine comprising a first frame reciprocable along a first axis, a second frame located along said first axis in juxtaposition to said first frame and reciprocable along a second axis transverse to the first axis, work holder means on one of said frames for holding a work piece generally parallel to said first axis, a plurality of finishing means mounted side-by-side on the other of said frames with the finishing surfaces thereof transverse to said first axis, and means for reciprocating said frames along their respective axes in timed relation to one another to bring a work piece into engagement selectively with each of said finishing means, the last-named means comprising first cam means for moving said first frame along said first axis toward and away from said second frame and second cam means having a predetermined relation to said first cam means for moving said second frame along said second axis during the time said first frame is moved away from said second frame by said first cam means, said second cam means including a plurality of cam surfaces for retaining said second frame means in a plurality of successive positions along said second axis, one of said cam surfaces being inclined for imparting a traverse movement to said second frame during the time said second frame is maintained generally in position by said one cam surface.

10. A forming and sizing machine comprising a first frame reciprocable along a first axis, a second frame located along said first axis in juxtaposition to said first frame and reciprocable along a second axis transverse to the first axis, work holder means on one of said frames for holding a work piece generally parallel to said first axis, a plurality of finishing means mounted side-by-side on the other of said frames with the finishing surfaces thereof transverse to said first axis, means for reciprocating said frames along their respective axes in timed relation to one another to bring the work piece into engagement selectively with each of said finishing means, said reciprocating means comprising a cam shaft transverse to said first axis, a first cam fixed on said shaft and having a plurality of lobes for moving said first frame toward and away from said second frame a plurality of times during each revolution of said shaft, and a second cam fixed on said shaft having a plurality of axially spaced cam surfaces for retaining said second frame selectively in a plurality of positions along said second axis during each revolution of said shaft, in which positions each of said finishing means is respectively aligned with the work piece, said second cam having ramps between said surfaces aligned respectively with said lobes for shifting said second frame along said second axis when said first frame is moved away from said second frame.

11. A forming and sizing machine comprising a first frame reciprocable along a first axis, a second frame located along said first axis in juxtaposition to said first frame and reciprocable along a second axis transverse to the first axis, a work holder journalled on one of said frames for holding a work piece generally parallel to said first axis, means for rotating said work holder, a plurality of rotary finishing means mounted side-by-side on the other of said frames with the finishing surfaces thereof transverse to said first axis, means for rotating said finishing means, and means for reciprocating said frames along their respective axes in timed relation to one another to bring a work piece into engagement selectively with each of said finishing means, said reciprocating means comprising a cam shaft tranvserse to said first axis, a first cam fixed on said shaft and having a plurality of lobes for moving said first frame toward and away from said second frame a plurality of times during each revolution of said shaft, a second cam fixed on said shaft and having a plurality of axially spaced cam surfaces for retaining said second frame selectively in a plurality of positions along said second axis during each revolution of said shaft, in which positions said finishing means are respectively aligned with the work piece, said second cam having ramps between said surfaces aligned respectively with said lobes for shifting said second frame along said second axis when said first frame is moved away from said second frame, one of said surfaces being inclined for imparting a traverse movement to said second frame in one of its positions, and means for rotating said shaft a single revolution.

12. In a forming and sizing machine comprising a first frame reciprocable along a first axis, a second frame located along said first axis in juxtaposition to said first frame and reciprocable along a second axis transverse to said first axis, a work holder journalled on one of said frames for holding a work piece generally parallel to said first axis, means for rotating said work holder, a plurality of finishing instrumentalities mounted side-by-side on the other of said frames with the finishing surfaces thereof transverse to said first axis, means for reciprocating said frames along their respective axes in timed relation to one another to bring a work piece into engagement selectively with each of said instrumentalities, said reciprocating means comprising first cam means for moving said first frame along said first axis toward and away from said second frame and second cam means having a predetermined relation to said first cam means for moving said second frame along said second axis during the time said first frame is moved away from said second frame by said first cam means, a template on said work holder rotatable therewith, and switch means on said other frame connected to and governing operation of said means for rotating said work holder, said switch means being located in correlation to said instrumentalities and for engagement by said template to cause rotation of said work holder as successive portions of the work piece are finished down to size.

13. A forming and sizing machine comprising a first frame reciprocable along a first axis, a second frame located along said first axis in juxtaposition to said first frame and reciprocable along a second axis transverse to the first axis, a work holder journalled on one of said frames including means for holding a work piece generally parallel to said first axis, means for rotating said work holder, a plurality of rotary finishing instrumentalities mounted side-by-side on the other of said frames with the finishing surfaces thereof transverse to said first axis, means for rotating said instrumentalities, means for reciprocating said frames along their respective axes in timed relation to one another to bring a work piece into engagement selectively with each of said instrumentalities, said reciprocating means comprising a common cam shaft, a first cam fixed on said shaft for moving said first frame along said first axis toward and away from said second frame, a second cam fixed on said shaft in predetermined relation to said first cam for moving said second frame along said second axis during the time said first frame is moved away from said second frame by said first cam, means for rotating said shaft, a template on said work holder rotatable therewith, and a combined stop and switch assembly mounted on said other frame, said assembly including a plurality of switches located in correlation with respective ones of said finishing instrumentalities and for selective engagement by said template, said switches being connected to and governing operation of said means for rotating said work holder to cause rotation of said work holder as successive portions of a work piece are finished down to size by the respective instrumentality.

14. A forming and sizing machine comprising a first frame reciprocable along a first axis; a second frame located along said first axis in juxtaposition to said first frame and reciprocable along a second axis at right angles to said first axis; a work carriage floatingly mounted on said first frame for self-adjusting movement parallel to said second axis; a work holder journalled on said carriage parallel to said second axis; means for rotating said work holder; a plurality of rotary finishing instrumentalities mounted side-by-side on said second frame on an axis transverse to said first axis, means for rotating said instrumentalities; means for reciprocating said frames along their respective axes in timed relation to one another to bring a work piece into engagement selectively with each of said instrumentalities, said reciprocating means comprising a cam shaft parallel to said second axis, a first cam fixed on said cam shaft and having a plurality of lobes for moving said first frame toward and away from said second frame a plurality of times during each revolution of said cam shaft, a second cam fixed on said cam shaft having a plurality of axially spaced cam surfaces for retaining said second frame selectively in plurality of positions along said second axis during each revolution of said cam shaft, in which positions said instrumentalities are respectively aligned with the work piece, said second cam having ramps between said surfaces aligned respectively with said lobes for shifting said second frame along said second axis when said first frame is moved away from said second frame, said means for rotating said shaft a single revolution; a template on said work holder rotatable therewith; and a combined stop and switch assembly mounted on said second frame, said assembly including a plurality of switches located in correlation with respective ones of said finishing instrumentalities and for selective engagement by said template, said switches being connected to and governing operation of said means for rotating said work holder to cause rotation of said work holder as successive portions of a work piece are finished down to size by a respective instrumentality.

15. In a forming and sizing machine comprising a first frame reciprocable along a first axis, a second frame located along said first axis in juxtaposition to said first frame and reciprocable along a second axis transverse to said first axis, a work holder journalled on one of said frames for holding a work piece generally parallel to said first axis, means for rotating said work holder, finishing instrumentalities mounted side-by-side on the other of said frames with the finishing surfaces thereof transverse to said first axis, means for reciprocating said frames along their respective axes in timed relation to one another to bring a work piece into engagement selectively with said instrumentalities, said reciprocating means comprising first cam means for moving said first frame along said first axis toward and away from said second frame and second cam means having a predetermined relation to said first cam means for moving said second frame along said second axis during the time said first frame is moved away from said second frame by said first cam means, common means for rotating said work holder and operating said cams, a template on said work holder rotatable therewith, first switch means on said other frame connected to and governing operation of said common means, said switch means being located in correlation to said instrumentalities and for engagement by said template to cause rotation of said work holder as successive portions of the work piece are finished down to size, and second switch means operatively associated with said reciprocating means and connected in parallel with said first switch means to said common means for operating said cam means during the time said first frame is moved away from said second frame by said first cam means.

16. A forming and sizing machine comprising a first frame reciprocable along a first axis, a second frame located along said first axis in juxtaposition to said first frame and reciprocable along a second axis transverse to the first axis, a work holder journalled on one of said frames including means for holding a work piece generally parallel to said first axis, a plurality of finishing instrumentalities mounted side-by-side on the other of said frames with the finishing surfaces thereof transverse to said first axis, means for reciprocating said frames along their respective axes in timed relation to one another to bring a work piece into engagement selectively with said instrumentalities, said reciprocating means comprising a cam shaft, a first cam fixed on said shaft for moving said first frame along said first axis toward and away from said second frame, a second cam fixed on said shaft in predetermined relation to said first cam for moving said second frame along said second axis during the time said first frame is moved away from said second frame by said first cam, common means for rotating said shaft and said work holder in predetermined relation to one another, first switch means operatively associated with said reciprocating means and rendered operative thereby only during the time said first cam is operative to move said first frame, a template on said work holder rotatable therewith, and second switch means mounted on said other frame in correlation with said finishing instrumentalities and for engagement by said template, said first and second switch means being connected in parallel with one another and to said common means for governing operation of said common means and for rotating said work holder and operating said cams primarily as a function of the finishing to size of successive portions of a work piece by each of said instrumentalities.

17. A forming and sizing machine comprising a first frame reciprocable along a first axis, a second frame located along said first axis in juxtaposition to said first frame and reciprocable along a second axis transverse to said first axis, a work carriage floatingly mounted on said first frame for self-adjusting movement transversely of said first axis, a work holder journalled on said carriage and including means for holding a work piece generally parallel to said first axis, means for rotating said work holder, a plurality of finishing instrumentalities mounted side-by-side on said second frame with the finishing surfaces thereof transverse to said first axis, said instrumentalities including a roughing instrumentality and a fine finishing instrumentality having a configured finishing surface, means for reciprocating said frames along their respective axes in timed relation to one another to bring a work piece into engagement selectively with said instrumentalities, said reciprocating means comprising a cam shaft transverse to one of said first and second axes, a first cam fixed on said shaft for moving said first frame along said first axis toward and away from said second frme, a second cam fixed on said shaft in predetermined relation to said first cam for moving said second frame along said second axis during the time said first frame is moved away from said second frame by said first cam, said second cam including a sloping cam surface for relatively traversing said roughing intsrumentality and the work piece when the same are engaged, and a third cam fixed on said shaft in predetermined relation to said sloping cam surface for locking said carriage to said first frame during the relative traversing of said roughing instrumentality and the work piece and for releasing said carriage to accommodate floating movement of the work piece relative to the configured surface of said fine finishing instrumentality.

18. A forming and sizing machine comprising a first frame reciprocable along a first axis, a second frame juxtaposed to said first frame, a work carriage floatingly mounted on said first frame for self-adjusting movement transversely of said first axis, a work holder journalled on said carriage and including means for holding a work piece generally parallel to said first axis, an extension on said work holder slidably but non-rotatably connected thereto, a template on said extension, means on said first frame retaining said extension and said template against movement axially of said work holder, means for rotating said work holder and thereby said extension and said template, a finishing instrumentality mounted on said second frame having a configured finishing surface disposed generally transversely of said first axis, means for reciprocating said first frame along said first axis to bring a work piece into engagement with said surface of said instrumentality, said carriage accommodating self-adjusting movement of the work piece relative to said surface, and switch means mounted on said second frame in correlation with said finishing instrumentality and for engagement by said template, said switch means being connected to and governing operation of said means for rotating said work holder to cause rotation of said work holder as successive portions of a work piece are finished down to size by said instrumentality, said extension and said retaining means maintaining said template in alignment with said switch means while accommodating the aforesaid self-adjusting movement of the work piece.

19. A forming and sizing machine comprising a first frame reciprocable along a first axis, a second frame juxtaposed to said first frame, a work carriage floatingly mounted on said first frame for self-adjusting movement transversely of said first axis, a work holder journalled on said carriage and including means for holding a work piece generally parallel to said first axis, an extension on said work holder slidably but non-rotatably connected thereto, a template on said extension, means on said first frame retaining said extension and said template against movement axially of said work holder, means for rotating said work holder and thereby said extension and said template, a finishing instrumentality mounted on said second frame having a configured finishing surface disposed generally transversely of said first axis, means for reciprocating said first frame along said first axis to bring a work piece into engagement with said surface of said instrumentality, said carriage accommodating self-adjusting movement of the work piece relative to said surface, said reciprocating means including a cam operatively connected to said means for rotating said work holder and having lobe means for moving said first frame toward and away from said second frame, first switch means associated with said cam for energizing said means for rotating said work holder only when said lobe means is moving said first frame, and second switch means mounted on said second frame in correlation with said finishing instrumentality and for engagement by said template, said switch means being connected in parallel with one another and being connected to and governing operation of said means for rotating said work holder to cause rotation of said work holder primarily as successive portions of a work piece are finished down to size by said instrumentality, said extension and said retaining means maintaining said template in alignment with said switch means while accommodating the aforesaid self-adjusting movement of the work piece.

20. A forming and sizing machine comprising a first frame reciprocable along a first axis, a second frame located along said first axis in juxaposition to said first frame, work holder means journalled to one of said frames including means for holding a work piece generally parallel to said first axis, means for rotating said work holder means, a finishing intsrumentality mounted on the other of said frames with the finishing surface thereof transverse to said first axis, means driven with said work holder means for reciprocating said first frame along said first axis to move a work piece into and out of engagement with said instrumentality, first switch means operatively associated with said reciprocating means and rendered operative thereby substantially only when the work piece is moved out of engagement with said instrumentality, a template on said work holder means rotatable therewith, and second switch means on said other frame located in correlation to said instrumentality and for engagement by said template and rendered operative only when engaged by said template, said switch means being connected in parallel with one another and being connected to and governing operation of said means for rotating said work holder means to effect operation thereof primarily as a function of the finishing down to size of successive portions of the work piece.

21. A forming and sizing machine comprising a first frame reciprocable along a first axis, a second frame located along said first axis in juxtaposition to said first frame and reciprocable along a second axis transverse to the first axis, a work holder on one of said frames for holding a work piece generally parallel to said first axis, finishing instrumentalities mounted side-by-side on the other of said frames with the finishing surfaces thereof transverse to said first axis, means for reciprocating said frames along their respective axes in timed relation to one another to bring a work piece into engagement selectively with said instrumentalities, said reciprocating means including a cam movable through a single revolution in a complete machine cycle and having a plurality of frame moving lobe means thereon for moving one of said frames a plurality of times during such revolution, one of said lobe means including a raised portion, on-off switch means operatively associated with said lobe means and located for actuation by said raised portion of said one lobe means to turn the machine off at the end of a complete cycle, the other lobe means of said cam normally having no effect on said switch means, and a control member adjacent said switch means for selective interposition relative to said switch means and said cam to cause said other lobe means to turn the machine off at an intermediate point in the complete cycle of machine operation.

22. In a forming and sizing machine having a finishing instrumentality, a work piece holder reciprocable toward and away from the instrumentality, means for rotating the holder, a template on the holder rotatable therewith and switch means engageable by the template causing rotation of the holder as successive portions of a work piece are finished down to size; the improvement comprising a follower member operatively associated with said switch means for actuating the same when moved by the template, a follower pad movably mounted on said member for movement toward and away from the template and engageable by the template to govern finishing of the work piece, and a cam movably mounted on said member and operatively associated with said pad for moving said pad relative to said member to provide predetermined compensation for differentials in finishing effects between relatively thin and relatively thick work pieces.

23. In a forming and sizing machine having a rough finishing instrumentality and a fine finishing instrumentality, means for moving a work piece toward and away from and sequentially into engagement with the instrumentalities and for rotating the work piece relative to the instrumentalities, a template rotatable with the work piece, and switch means engageable by the template for causing rotation of the work piece as successive portions of the work piece are finished down to size; the improvement comprising a template follower member operatively associated with the switch means for actuating the same when moved by the template, a rough finish follower pad and a fine finish follower pad on said member correlated respectively to the rough and fine finishing instrumentalities and sequentially engageable by the template to govern rough and fine finishing of the work piece, said rough finish follower pad being movably mounted on said follower member for movement toward and away from the template, and a cam movably mounted on said member and operatively associated with said rough finish follower pad for moving said pad relative to said member to afford predetermined compensation for differentials in rough finishing effects between relatively thin and relatively thick work pieces.

References Cited

UNITED STATES PATENTS

| | | | |
|---|---|---|---|
| 1,197,785 | 9/1916 | Arnold | 51—101 |
| 1,619,358 | 3/1927 | Maynard | 51—101 |
| 2,166,037 | 7/1939 | Campos | 51—101 |
| 2,674,068 | 4/1954 | Eves | 51—101 |
| 3,019,562 | 2/1962 | Price | 51—3 |
| 3,121,979 | 2/1964 | Gray | 51—101 |

ROBERT C. RIORDON, *Primary Examiner.*

D. G. KELLY, *Assistant Examiner.*